United States Patent [19]
Curry

[11] Patent Number: 5,357,273
[45] Date of Patent: Oct. 18, 1994

[54] RESOLUTION CONVERSION VIA INTENSITY CONTROLLED OVERSCANNED ILLUMINATION FOR OPTICAL PRINTERS AND THE LIKE HAVING HIGH GAMMA PHOTOSENSITIVE RECORDING MEDIA

[75] Inventor: Douglas N. Curry, Menlo Park, Calif.

[73] Assignee: Xerox Corporation, Stamford, Conn.

[21] Appl. No.: 918,092

[22] Filed: Jul. 24, 1992

Related U.S. Application Data

[63] Continuation-in-part of Ser. No. 736,989, Aug. 8, 1991, Pat. No. 5,138,339.

[51] Int. Cl.$^5$ ............................................. G01D 9/42
[52] U.S. Cl. .................................... 346/108; 358/298
[58] Field of Search ................ 346/108, 160; 358/296, 358/298

[56] References Cited

U.S. PATENT DOCUMENTS

| | | | |
|---|---|---|---|
| 4,437,122 | 3/1984 | Walsh et al. | 358/166 |
| 4,460,909 | 7/1984 | Bassetti et al. | 346/160 |
| 4,476,474 | 10/1984 | Kitamura | 346/160 |
| 4,544,264 | 10/1985 | Bassetti et al. | 346/160 |
| 4,622,593 | 11/1986 | Curry | 358/284 |
| 4,625,222 | 11/1986 | Bassetti et al. | 346/160 |
| 4,639,789 | 1/1987 | Curry | 358/285 |
| 4,681,424 | 7/1987 | Kantor et al. | 346/160 |
| 4,766,560 | 8/1988 | Curry et al. | 364/721 |
| 4,775,896 | 10/1988 | Umeda et al. | 358/298 |
| 4,847,641 | 7/1989 | Tung | 346/154 |
| 4,860,237 | 8/1989 | Curry | 364/718 |
| 4,893,136 | 1/1990 | Curry | 346/108 |
| 4,912,568 | 3/1990 | Shimano | 358/457 |
| 4,926,248 | 5/1990 | Kobayashi et al. | 358/75 |
| 4,935,891 | 6/1990 | Curry | 364/721 |
| 5,128,698 | 7/1992 | Crawford et al. | 346/160 |
| 5,138,339 | 8/1992 | Curry et al. | 346/108 |

*Primary Examiner*—Benjamin R. Fuller
*Assistant Examiner*—Randy W. Gibson
*Attorney, Agent, or Firm*—Oliff & Berridge

[57] ABSTRACT

A method for resolution conversion by microaddressing an image transition in a printer includes steps of writing a print bit at zero intensity when a current image bit is in a second state and a displacement distance is greater than or equal to one-half of a pitch distance; writing the print bit at maximum intensity when the current bit is in a first state and the displacement distance is greater than or equal to one-half of the pitch distance; and writing the print bit at less than maximum intensity when the current image bit is in the first state and the displacement distance is less than one-half of the pitch distance, the step of writing the bit bit at less than maximum intensity including a step of intensity modulating a writing device based on a function proportional to a sum of the displacement distance plus one-half of the pitch distance. A print intensity controller to generate intensity data includes a modulo counter for generating print bit position data based on an image raster width and a number of intensity steps; and a memory for producing the intensity data based on the number of intensity steps, the print bit position data, a current image bit and an adjacent image bit.

10 Claims, 15 Drawing Sheets

RESOLUTION CONVERSION VIA INTENSITY CONTROLLED OVERSCANNED ILLUMINATION FOR OPTICAL PRINTERS AND THE LIKE HAVING HIGH GAMMA PHOTOSENSITIVE RECORDING MEDIA

This is a continuation in part of application Ser. No. 07/736,989 filed Aug. 8, 1991, now U.S. Pat. No. 5,138,339.

FIELD OF THE INVENTION

This invention relates to printers and other optical display systems having high gamma, photosensitive recording media and, more particularly, to relatively inexpensive and easily implemented methods and means for increasing the precision with which these display systems spatially position edges and other types of transitions in the images they display. Even more specifically, this invention pertains to economical and technically attractive methods and means for increasing the precision with which optical printers that utilize high gamma recording media, such a xerographic printers, spatially position transitions in the images they print.

BACKGROUND OF THE INVENTION

Many of the commercially available laser printers, as well as some of the recently introduced electronic copiers, include flying spot raster output scanners (ROS's) for printing latent electrostatic images on xerographic photoreceptors, These photoreceptors generally have steeply sloped contrast vs. exposure characteristics (high gamma), together with well defined exposure thresholds (called the "xerographic threshold"), so they characteristically yield high contrast, bitmapped images (e.g., black and white). Some xerographic printers operate in a "write black" mode to optically expose the image foreground for printing by means of an "exposed area development" process, while others operate in a "write white" mode to expose the image background for printing by means of a "charged area development" process.

As is known, both write black and write white xerography are suitable for color printing. So-called "full color" xerographic prints customarily are composed by printing three or four different color separations (e.g., cyan, magenta and yellow for three color printing, and cyan, magenta, yellow and black for four color printing) in superimposed registration on a suitable substrate, such as plain paper. Highlight color prints, on the other hand, can be produced by printing as few as two color separations (e.g., black and a selected highlight color). There is, however, a common thread because each of these color separations generally is a high contrast image. It, therefore, will be evident that the fundamental operating principles and functional advantages of this invention apply to both monotone and color xerography.

Many of the ROS's that have been developed for xerographic printing employ a single beam or a multi-beam laser light source for supplying one or more intensity modulated light beams, together with a scanner (such as a polygon scanner) for cyclically deflecting the modulated laser beam or beams across a photoreceptor in a "fast scan direction" while the photoreceptor is being advanced simultaneously in an orthogonal, "process direction." In practice, each of the laser beams typically is brought to focus on or near the photoreceptor surface to provide a substantially focused "scan spot." The scan spot or spots, in turn, scan the photoreceptor in accordance with a predetermined scan pattern because the fast scan deflection of the laser beam or beams vectorially sums with the process direction motion of the photoreceptor. Indeed, the scan pattern is dependent upon and is determined by the scan rate (scans/sec.) of the scanner, the number of scan spots that are employed, and the process speed (inches/sec.) of the photoreceptor. Such a scan pattern produces an exposure pattern because the scans are superpositioned on the photoreceptor, regardless of whether the scans simultaneously or sequentially expose the photoreceptor. Accordingly, it is to be understood that the present invention applies to printers and other displays that employ single beam or multi-beam ROS's, even though this disclosure features the single beam/single scan spot case for the sake of simplification.

Laser illuminated flying spot ROS's ordinarily are designed to provide generally circular or elliptical scan spots. To a first approximation, such a scan spot is characterized by having a gaussian intensity profile (as is known, this may be a very rough approximation if the scan spot is truncated). Prior laser printers generally have employed scan patterns that are selected to have a scan pitch (i.e., the center-to-center displacement, in the process direction, between spatially adjacent scan lines) that is comparable to the diameter of the scan spot as determined at an intensity level that is equal to one-half of its maximum or peak intensity. This sometimes is referred to as the full width, half max. ("FWHM") diameter of the scan spot.

Images often contain many transitions. For instance, black and white and other dual tone images have transitions at the boundaries between their foreground features and their backgrounds, such as the transitions that demark line edges, font contours, and halftone dot patterns. Color images commonly include still additional transitions at the boundaries between differently colored foreground features. Consequently, the perceived quality of monotone and color prints tends to be strongly dependent upon the precision with which the printing process spatially positions these transitions.

Modern laser xerographic printers typically are designed to print at spatial resolutions ranging from about 300 dots/inch ("d.p.i") to about 600 d.p.i. As a practical matter, the image transition positioning precision of these printers can be increased to an extent by increasing their spatial resolution; but the frequency responses of the photoreceptor/developer combinations that currently are available for xerographic printing usually impose an upper limit on the resolution that can be achieved. Moreover, even when increased resolution is technically feasible, the additional resolution imposes further and potentially burdensome requirements on the optical and electrical design requirements of these printers, so there usually is a cost/performance tradeoff to be considered. Specifically, the cost of xerographic print engines tends to escalate as their spatial resolution is increased because of the additional memory and bandwidth these printers require for faithfully rendering higher resolution bitmap images without sacrificing throughput.

In apparent recognition of these technical challenges, others have proposed template matching techniques for more precisely controlling the size, positioning and number of picture elements ("pixels") that are printed on xerographic photoreceptors to render bitmapped images. For example, template matching has been developed for reducing the severity of certain printing artifacts, such as the observable stairstep-like scan structure (commonly referred to as "jaggies") that sometimes degrades the xerographically printed appearance of non-vertical and non-horizontal lines. See Tung U.S. Pat. No. 4,847,641, which issued Jul. 11, 1989 on "Piecewise Print Image Enhancement for Dot Matrix Printers" and Walsh et al U.S. Pat. No. 4,437,122, which issued Mar. 13, 1984 on "Low Resolution Raster Images." Template matching effectively overcomes some of the sampling errors that are caused by the use of input data that is too coarse to accurately represent the higher spatial frequency content of the image. It does not, however, solve the control problems that are encountered in existing printers because of the significant non-linearity of the way in which the spatial positioning and profiles of the transitions in the images they print tracks changes in the intensity of the transitional boundary scans. This "addressability response" issue is discussed in greater detail herein below.

It, therefore, will be evident that there still is a need for simplified methods and means for enabling optical printers and other display systems that render bit-mapped images on high gamma, photosensitive recording media, such as xerographic laser printers, to spatially position transitions within the images they render with a sub-resolution spatial precision (i.e., a precision that is greater than the spatial resolution of the system). More particularly, relatively inexpensive and easily implemented methods and means are needed for enabling laser ROS-type printers to spatially position transitions in the images they print to a precision, in the process direction, that is a sub-multiple of the scan pitch.

SUMMARY OF THE INVENTION

In response to the above-described need, the present invention provides microaddressable display systems for rendering two dimensional images on high gamma, photosensitive recording media. These systems are microaddressable because they operate in an overscanned mode to render images by scanning one or more intensity modulated scan spots over a recording medium of the foregoing type in accordance with a scan pattern that causes the scan spot or spots to superimpose multiple discrete exposures on the recording medium on generally uniformly spaced centers that are separated from each other by a pitch distance that is significantly less than the effective spatial diameter of the scan spot or spots (e.g., the full width/half max. diameter of a gaussian scan spot). Overscanned systems have substantially linear addressability responses, so boundary scans that are intensity modulated in accordance with preselected offset values are used in these systems for controlling the spatial positions at which image transitions are rendered to a sub-pitch precision.

It is an object of the present invention to overcome the above described limitations in the prior art. It is another object of the present invention to provide a method and apparatus for integer conversion of image data to printing data. It is another object of the present invention to provide flexible microaddressability of transition lines in a printer.

These and other objects are achieved with a method for resolution conversion by microaddressing an image transition in a printer including the steps of writing a print bit at maximum intensity when (1) a current image bit is in a first current bit state and an adjacent image bit is in a second adjacent bit state, (2) a print line center passes through the current image bit and (3) a pitch distance is less than or equal to twice a displacement distance in the process direction from the image transition to the print line center; and writing the print bit bit at less than maximum intensity when (1) the current image bit is in the first current state and the adjacent image bit is in the second adjacent bit state, (2) the print line center passes through the current image bit, and (3) the pitch distance is greater than twice the displacement distance, the step of writing the print bit at less than maximum intensity including a step of intensity modulating a writing device based on a function of the displacement distance.

These and other objects are achieved with the method for resolution conversion by microaddressing an image transition in a printer including the steps of writing a print bit at zero intensity when a current image bit is in a second current bit state and a displacement distance in a process direction from a print line center to the image transition is one of greater than and equal to one-half of a pitch distance; writing the print bit at maximum intensity when the current image bit is in a first current bit state and the displacement distance is one of greater than and equal to one-half of the pitch distance; and writing the print bit at less than maximum intensity when the current image bit is in the first current bit state and the displacement is less than one-half of the pitch distance, the step of writing the print bit at less than maximum intensity including a step of intensity modulating the writing device based on a function proportional to a sum of the displacement distance plus one-half of the pitch distance.

These and other objects are achieved by dividing the space between scan lines into a number of addressable subscans which is equivalent to the process direction addressability divided by the number of scans per inch, and has the value L; and the steps of (1) writing a print bit at maximum intensity when the current image bit is in the first state and no image transition occurs less than plus or minus L/2 addressable units from the current scan central axis, (2) writing a print bit at zero intensity when the current image bit is in the second state and no image transition occurs less than plus or minus L/2 addressable units from the current scan central axis, (3) writing the print bit at intermediate intensity when the image transition occurs within less than plus or minus L/2 addressable units from the current scan central axis, where the intermediate value can be obtained by intensity modulating a writing device, such as intensity modulation performed by analog modulation, pulse width modulation, or duty cycle modulation, and the value of the intermediate modulation calculated by keeping track of the position of the image transition with respect to the subscan position with a modulo counter, such counter having a modulus M equal to the addressability in subscans per inch divided by the print bit density in the process direction in bits per inch, which is the number of subscans in a process direction print bit, the current output of the modulo counter having a coded value m (or offset value); and the value of the intermediate intensity is (L/2)+m if the current image bit is in the first state, or (L/2)−m if the current image bit is in the second state.

These and other objects of the present invention are achieved using a print intensity controller including a modulo counter for generating bit print position data based on an image raster width and a number of intensity steps; and memory means for producing intensity data based on the number of intensity steps, the print bit position data, a current image bit and an adjacent image bit.

BRIEF DESCRIPTION OF THE DRAWINGS

Additional features and advantages of this invention will become apparent when the following detailed description is read in conjunction with the attached drawings, in which.

DETAILED DESCRIPTION

While the invention is described in some detail hereinbelow with specific reference to certain embodiments, it is to be understood that there is no intent to limit it to those embodiments. On the contrary, the aim is to cover all modifications, alternatives and equivalents falling within the spirit and scope of the invention as defined by the appended claims.

Figure 1:
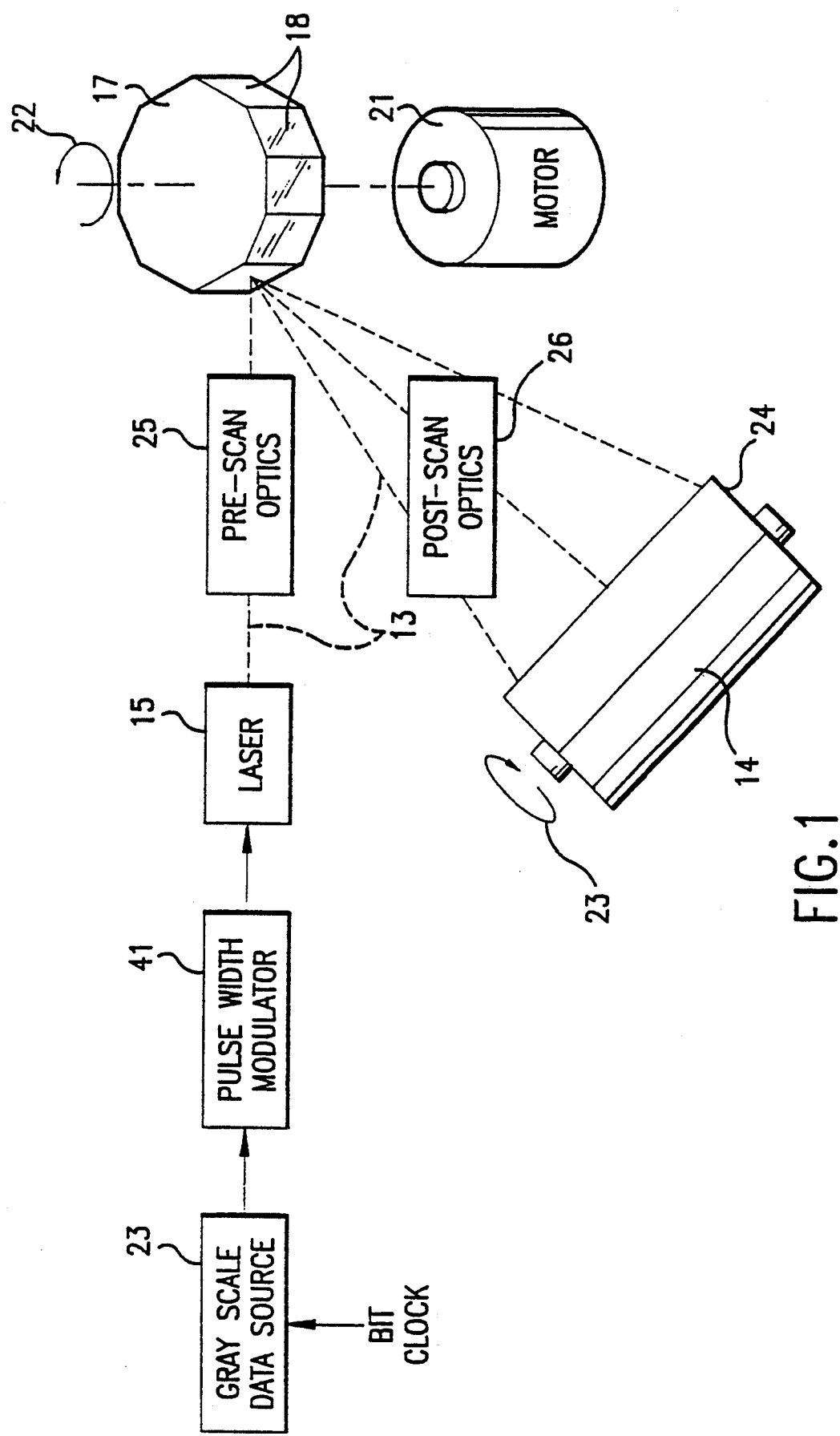
FIG. 1 is a simplified schematic diagram of a xerographic printer that is equipped to carry out the present invention.

Turning now to the drawings, and at this point especially to FIG. 1, there is a xerographic print engine 11 (shown only in relevant part) having a more or less conventionally configured flying spot ROS 12 for scanning a data modulated light beam 13 over a xerographic photoreceptor 14 in accordance with a predetermined raster scanning pattern. To that end, the ROS 12 comprises a laser diode 15 for emitting the light beam 13 in the visible or invisible (e.g., infra-red) band of the spectrum, together with a polygon scanner 17 that has a plurality of nearly identical, mirror-like exterior sidewalls or "facets" 18.

In keeping with standard practices, there is a motor 21 for rotating the scanner 17 about its central axis, as indicated by the arrow 22, at a substantially constant angular velocity. The scanner 17 is optically aligned between the laser 15 and the photoreceptor 14, so its rotation causes the laser beam 13 to be intercepted by and reflected from one after another of the scanner facets 18, with the result that the beam 13 is cyclically swept across the photoreceptor 14 in a fast scan direction. The photoreceptor 14, on the other hand, is advanced (by means not shown) simultaneously in an orthogonal, process direction at a substantially constant linear velocity, as indicated by the arrow 23, so the laser beam 13 scans the photoreceptor 14 in accordance with a raster scan pattern. As shown, the photoreceptor 14 is coated on a rotating drum 24, but it will be apparent that it also could be carried by a belt or any other suitable substrate.

Typically, the ROS 12 additionally includes pre-scan optics 25 and post-scan optics 26 for bringing the laser beam 13 to a generally circular focus proximate the photoreceptor 14 and for providing any optical correction that may be needed to compensate for scanner wobble and other optical irregularities. Preferably, the optical aperture of the ROS 12 is sufficiently large to avoid excessive truncation of the laser beam 13 because the beam 13 then comes to a generally circular or elliptical focus with a gaussian intensity profile. However, the broader aspects of this invention are not limited to any specific scan spot geometry or intensity profile. Accepted design principles indicate that the spatial frequency power spectrum of the scan spot profile should not have significant spatial frequency components outside the spatial frequency passband of the imaging system, but the scan spot can otherwise be tailored to satisfy a variety of system requirements.

To carry out the present invention, the amplitude, duty cycle, and/or pulse width of the laser beam 13 is serially modulated (collectively referred to herein as its "intensity modulation") in accordance with successive multi-bit digital data values. These data values are clocked out of a buffered data source 23 serially in response to data clock pulses which are time synchronized with the scan of the scan spot from bitmap location-to-bitmap location within the raster scan pattern.

Thus, the data clock frequency can be selected (by means not shown) to map the data onto the raster scan pattern at any desired magnification, using either the same or different magnifications in the fast scan and the process directions. As will be appreciated, the data may be preprocessed (by means not shown) for the printing of halftoned images and/or text and other types of line art, so the data source 23 generically represents any suitable source of gray scale data) for intensity modulating the laser beam 13.

As is known, the fast scan pixel positioning precision of the print engine 11 can be enhanced, if desired, by dynamically adjusting the frequency of the data clock to compensate for the pixel positioning errors that tend to be caused by "motor hunt" (i.e., variations in the angular velocity of the scanner 17), "polygon signature" characteristics (variations in the angular velocities at which the different facets 18 of the scanner 17 sweep the scan spot across the photoreceptor 14 from a start of scan position to an end of scan position), and "scan non-linearities" (i.e., localized variations in the linear velocity of the fast scan, which are caused by variances in the geometric relationship of the scanner 17 to spatially distinct segments of any given scan line). For more information on these sources of potential pixel positioning errors and the compensation that can be provided for those errors, the following commonly assigned United States Patents are hereby incorporated by reference: D. N. Curry U.S. Pat. No. 4,622,593 which issued Nov. 11, 1986 on "Polygon Signature Correction"; D. N. Curry U.S. Pat. No. 4,639,789 which issued Jan. 27, 1987 on "Raster Scanner Variable-Frequency Clock Circuit"; D. N. Curry et al. U.S. Pat. No. 4,766,560 which issued Aug. 23, 1988 on "Parallel/Pipelined Arithmetic Variable Clock Frequency Synthesizer"; D. N. Curry U.S. Pat. No. 4,860,237 which issued Aug. 22, 1989 on "Scan Linearity Correction"; D. N. Curry U.S. Pat. No. 4,893,136 which issued Jan. 9, 1990 on "Arithmetically Computed Motor Hunt Compensation for Flying Spot Scanners"; and D. N. Curry U.S. Pat. No. 4,935,891 which issued Jun. 19, 1990 on "Pseudo-Random Phase Shifted Arithmetic Bit Clock Generators for Digital Printers." It is to be understood, however, that the increased pixel positioning precision that these existing compensation techniques provide strictly pertains to the spatial positioning of the pixel centers in the fast scan direction. This differs from the two dimensional "high addressability" or "microaddressability" that this invention provides because microaddressability enables image transitions to be spatially positioned with sub-resolution precision in both the process direction and the fast scan direction. This feature sometimes is referred to as "two dimensional high addressability" or, in abbreviated form, as "2D high addressability."

More particularly, in accordance with the present invention, the pitch of the scan pattern for the printer 11 is selected to be significantly finer (i.e., smaller) than the FWHM diameter of the scan spot that is formed from the scan beam 13. This relatively fine pitch scan pattern causes the printer 11 to operate in an "overscanned" mode because the FWHM central core of the scan spot sweeps across spatially overlapping segments of the photoreceptor 14 during the scanning of spatially adjacent (i.e., neighboring) scan lines. Overscanning slightly degrades the spatial frequency response of the printer 11 in the process direction. However, it has been found the linearity of the addressability response of ROS printers, such as the printer 11, increases rapidly as the ratio of the scan pitch to the FWHM diameter of the scan spot is reduced to progressively smaller, sub-unity values (i.e., increasing the overscan). In other words, it has been found that overscanning is the key to providing the essentially linear position control that enables discrete exposures to map image transitions onto a scan pattern at a sub-resolution precision. Thus, in the printer shown in FIG. 1, a relatively small loss of process direction frequency response is accepted to achieve substantially increased process direction addressability. As will be seen, the use of an overscan factor (i.e., the ratio of the FWHM diameter of the scan spot to the scan pitch) in excess of about 2×–4× only marginally improves the linearity of the addressability response of the printer 11, so designers contemplating the use of overscan factors greater than 2× or so should carefully analyze the overall performance of the system that is being designed to ensure that it is satisfactory.

Figure 2A:
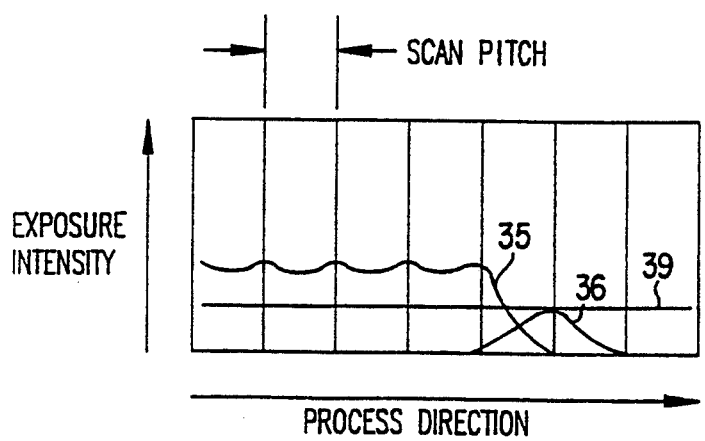
FIG. 2A illustrates the affect of a partial intensity boundary scan on the process direction impulse response of a printer of the type shown in FIG. 1 when the ROS scans the photoreceptor in accordance with a scan pattern having a scan pitch approximately equal to the FWHM diameter of the scan spot.
Figure 2B:
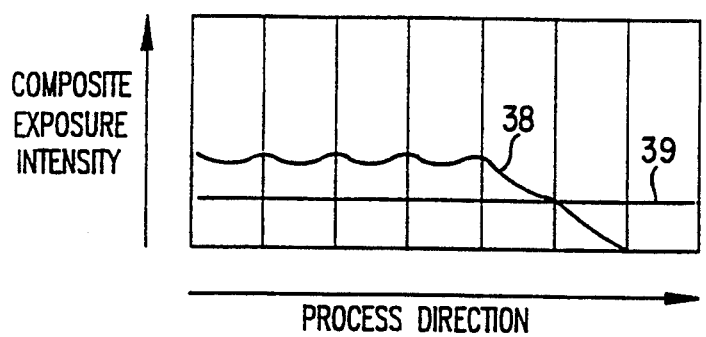
FIG. 2B illustrates the composite exposure profile that defines the process direction impulse response of a printer of the type shown in FIG. 1 when the printer is operated in accordance with FIG. 2A.
Figure 2C:
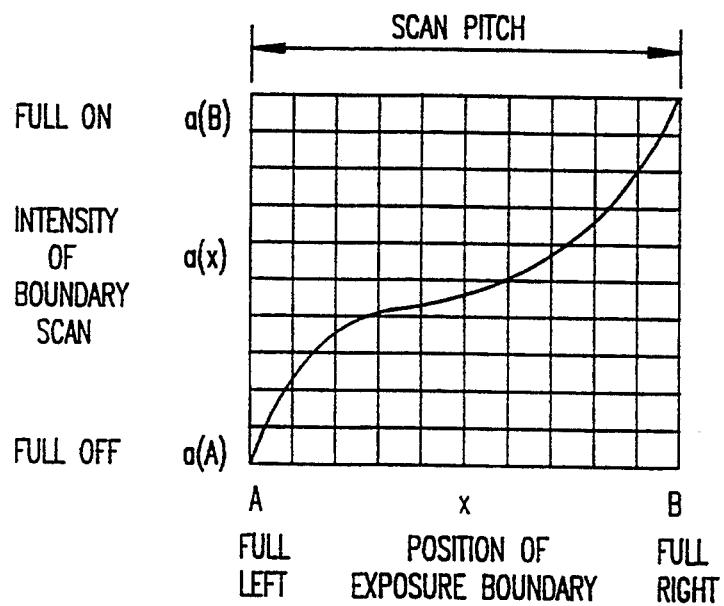
FIG. 2C is an addressability response curve (boundary scan intensity vs. exposure boundary displacement) for a printer of the type shown in FIG. 1 when the printer uses a scan pattern that has a scan pitch approximately equal to the FWHM diameter of the scan spot.

More particularly, FIGS. 2A–2B illustrate the exposure of a typical xerographic photoreceptor, such as the photoreceptor 14 (FIG. 1), to a step function that is oriented in the process direction, when the printing is performed by scanning a generally circular scan spot having a gaussian intensity profile over the photoreceptor in accordance with a scan pattern having a pitch approximately equal to the FWHM diameter of the scan spot. The step function is a typical image transition, which is defined by (a) a series of full intensity scans (the exposure caused by them is shown in FIG. 2A at 35), followed by (b) a single intensity modulated transitional or "boundary" scan as at 36 in FIG. 2A, and then by (c) a series of full-off or zero intensity scans. FIG. 2B demonstrates that the superpositioning of the discrete exposures that result from such a sequence of scans causes the exposures to additively combine, thereby producing a composite exposure profile 38 that crosses the xerographic threshold 39 of the photoreceptor 14 at a position which spatially varies as a function of the intensity of the boundary scan 36 (for illustrative purposes, the xerographic threshold 39 is depicted as being at about one half the peak level of the composite exposure profile 38). FIG. 2C, in turn, shows that there is a non-linearity of about ±15% in the relationship between the intensity of the boundary scan 36 and the spatial positioning of the point at which the exposure profile 38 crosses the xerographic threshold 39 (i.e., the spatial position of the image transition).

Figure 3A:
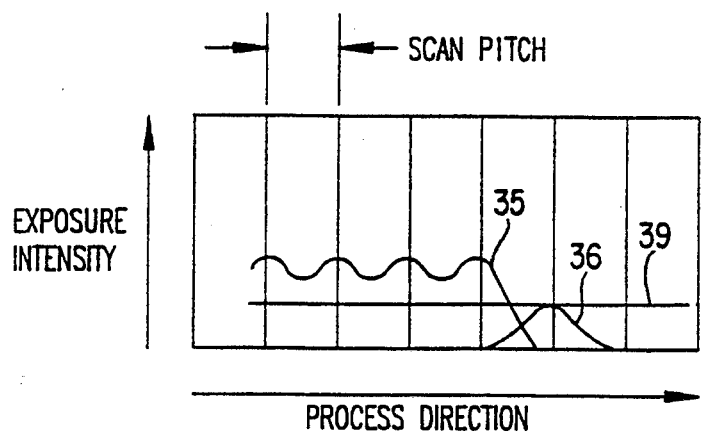
FIGS. 3A-3C are similar to FIGS. 2A-2C, respectively, except that the scan pattern upon which they are based has a pitch that is approximately equal to 1.25 times the FWHM diameter of the scan spot.
Figure 3B:
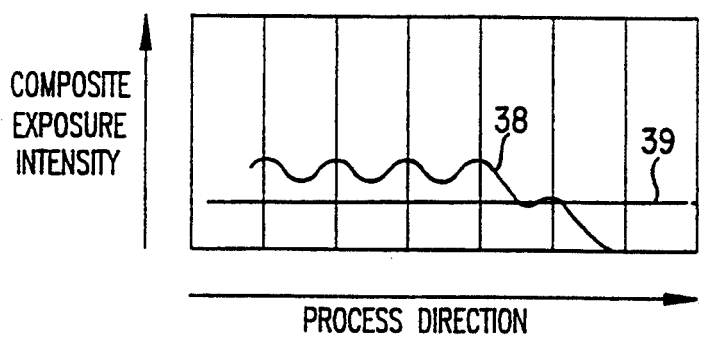
Figure 3C:
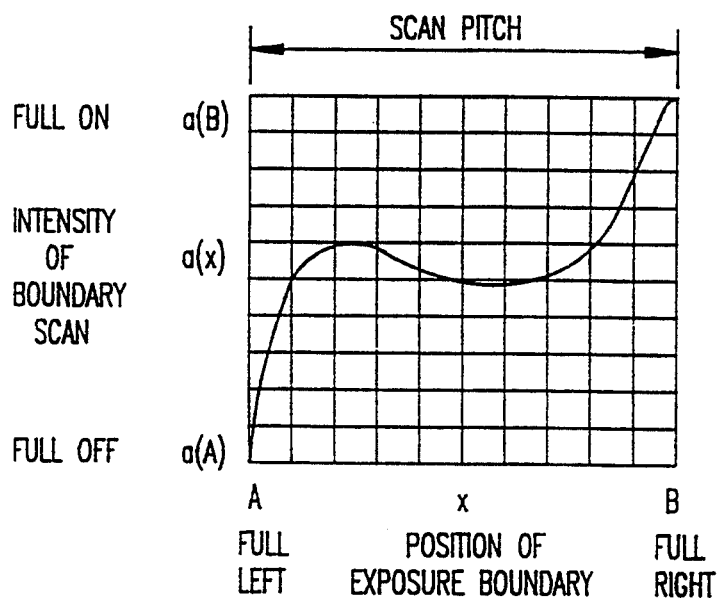
Figure 4A:
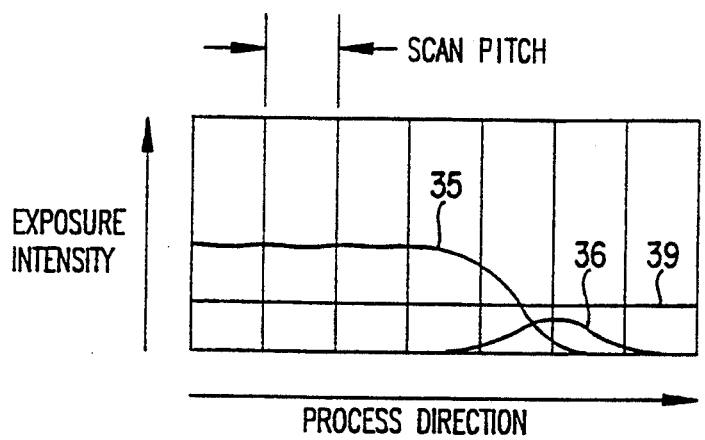
FIGS. 4A-4C also are similar to FIGS. 2A-2C, respectively, except that the scan pattern upon which they are based has a pitch that is approximately equal to 0.75 times the FWHM diameter of the scan spot.
Figure 4B:
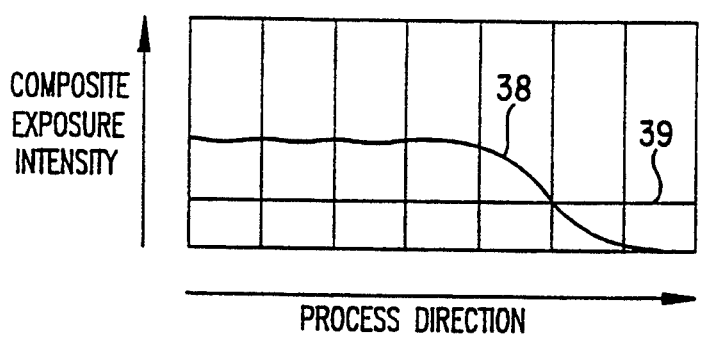
Figure 4C:
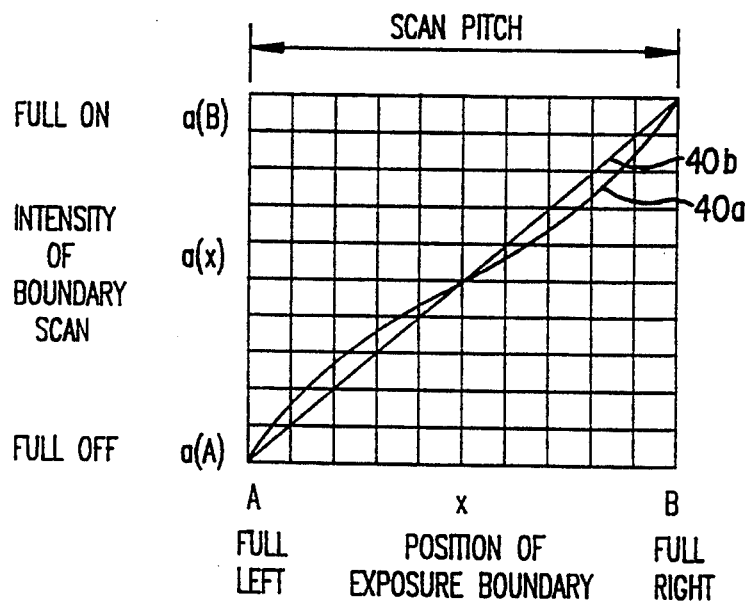

FIGS. 3A–3C provide the same analysis as FIGS. 2A–2C, respectively, for a case in which the scan pitch is selected to be approximately 1.25 times the FWHM diameter of the scan spot. FIG. 3C indicates that the non-linearity in the relationship between the intensity of the boundary scan 36 (FIG. 3A) and the spatial positioning of the point at which the exposure profile 38 (FIG. 3B) crosses the xerographic threshold 39 is non-monotonic. Thus, it will be evident that such a relatively coarse scan pitch is unattractive when the goal is to provide increased control over the spatial positioning of the image transitions.

Figure 5A:
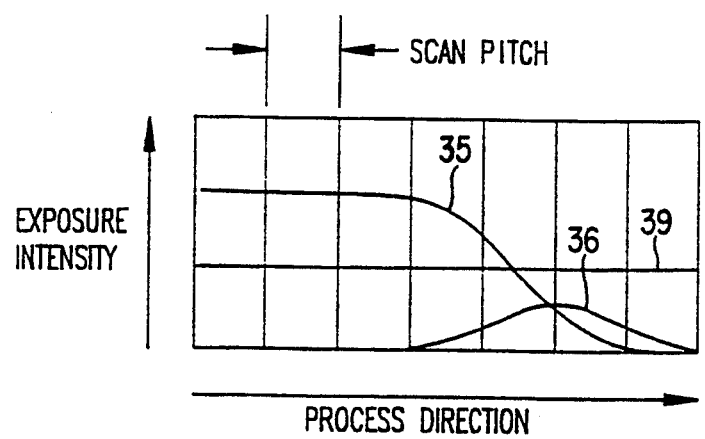
FIGS. 5A-5C again are similar to FIGS. 2A-2C, respectively, except that the scan pattern upon which they are based has a pitch that is approximately equal to 0.50 times the FWHM diameter of the scan spot.
Figure 5B:
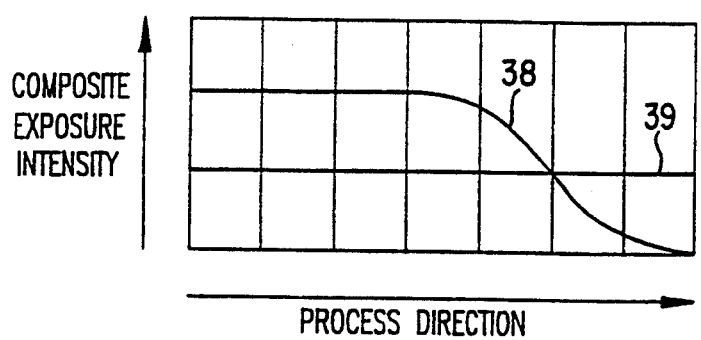
Figure 5C:
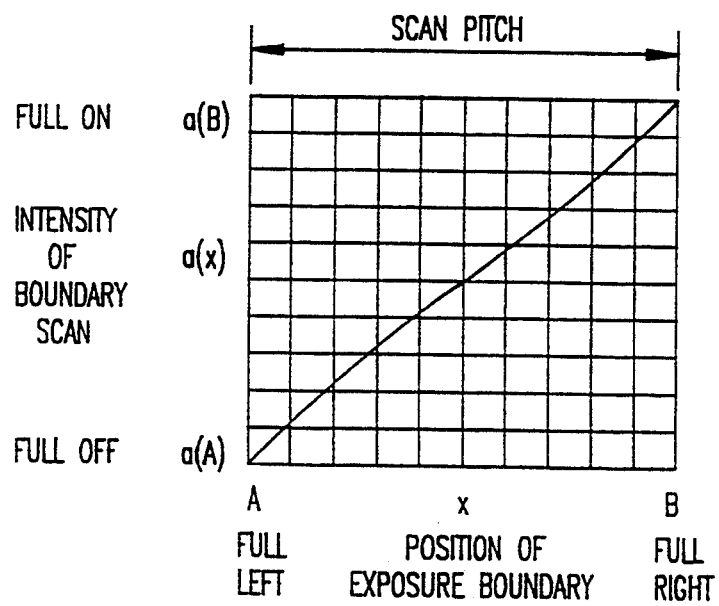
Figure 6A:
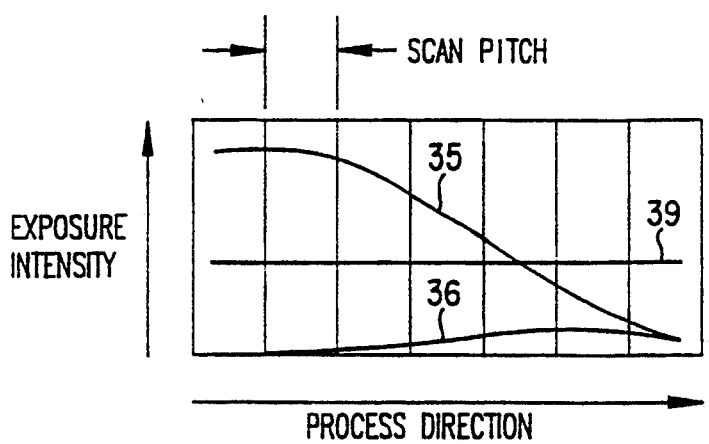
FIGS. 6A-6C office again are similar to FIGS. 2A-2C, respectively, except that the scan pattern upon which they are based has a pitch that is approximately equal to 0.25 times the FWHM diameter of the scan spot.
Figure 6B:
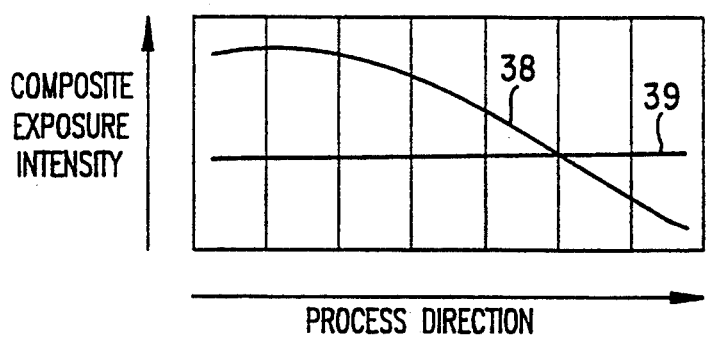
Figure 6C:
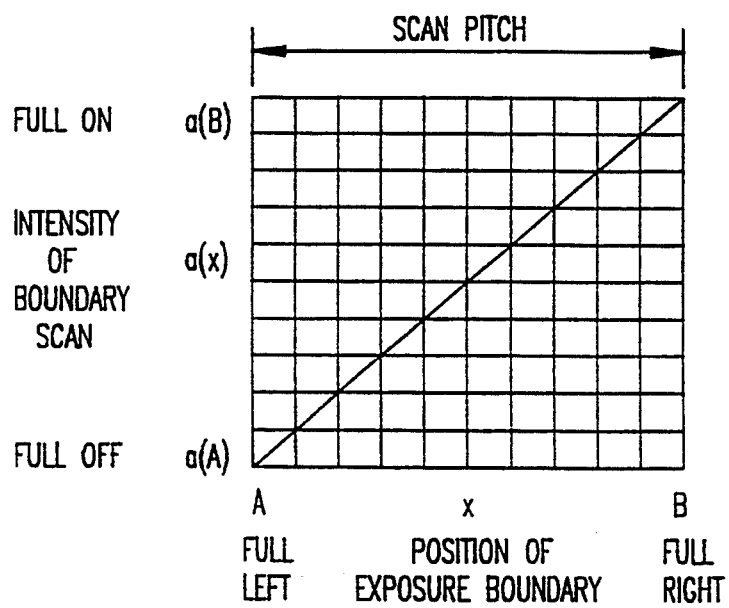

FIGS. 4A–4C, 5A–5C, and 6A–6C, on the other hand, extend the analysis of FIGS. 2A–2C to cases in which the scan pitch is selected to be approximately 0.75, 0.50 and 0.25 times the FWHM diameter of the scan spot, respectively. These cases demonstrate that the relationship between the intensity of the boundary scan 36 and the spatial positioning of the point at which the exposure profile 38 crosses the xerographic threshold 39 of the photoreceptor 14 becomes increasingly linear as the ratio of scan pitch to the FWHM diameter of the scan spot is reduced to progressively smaller, sub-unity values. Specifically, the boundary scan intensity/exposure boundary position relationship is linear to within: (1) about ±7% when the scan pitch is three quarters of the FWHM diameter of the scan spot (FIG. 4C), (2) about ±3% when the scan pitch is one half of the FWHM diameter (FIG. 5C), and (3) about ±1% when the scan pitch is one quarter of the FWHM diameter (FIG. 6C).

As previously pointed out, the overscanning that results from the use of these finer pitch scan patterns degrades the spatial frequency response of the printer 11 in the process direction. A limited overscan is, however, consistent with the printing of high quality images because it permits the image transitions (i.e., the high spatial frequency content of the images) to be mapped onto the scan pattern with increased spatial precision.

To capitalize on the ability of the printer 11 to more precisely position image transitions in the process direction, the multi-bit data values that are supplied by the data source 23 are modulated (by means not shown) so that each of the image transitions is represented by a data value that is substantially linearly proportional to the desired spatial offset (in predetermined sub-scan pitch units) of the transition from the nearest "macroaddressed" exposure boundary position (i.e., the spatial location at which the composite exposure profile 38 (FIGS. 4B, 5B and 6B) would cross the xerographic threshold 39 if the boundary scan 36 had a null or zero intensity level). This data modulation causes a corresponding intensity modulation of the laser beam 13, thereby permitting the spatial positioning of the exposure boundaries that define the image transitions (i.e., the locations at which the composite exposure profile 38 crosses the xerographic threshold 39) to be substantially linearly controlled to a precision that is a submultiple of the scan pitch over a distance equal to the scan pitch. This is referred to herein as "microaddressability" to distinguish it from the coarser "macroaddressability" that is provided by full intensity scans.

In practice, the microaddressability of the printer 11 is largely dependent upon the granularity at which the data values for the boundary scans specify the desired exposure boundary offsets. For example, if three bit long data values are supplied, five of the eight available digital values suitably are used for controlling the positioning of the exposure boundaries in 25% increments over a span equal to the scan pitch (i.e., a positional granularity of one quarter of a scan pitch), from a "full left" or 0% offset position to a "full right" or 100% offset position (see FIG. 7A). That effectively causes the process direction addressability of the printer 11 to be four times finer than the scan pitch because the data value for any given boundary scan can be selected to spatially offset the position of the corresponding exposure boundary (or, in other words, image transition) from the nearest macroaddressed boundary position by 0%, 25%, 50%, 75%, or 100% of the scan pitch.

If desired, the data values for the boundary scans may be precompensated (by means not shown) to compensate for any residual non-linearity of the addressability response (i.e., the boundary scan intensity/exposure boundary position relationship) of the printer 11 at the selected scan pitch. This precompensation provides the data values that are needed to cause the actual spatial positioning of the transitions to even more closely track the desired positioning (as shown, for example in FIG. 4C, the compensating intensity adjustment is given by the difference between the actual addressability response curve 40a and the linear approximation thereof 40b). Preferably, however, the need for this precompensation is avoided by using a scan pitch that is sufficiently fine to permit the positioning errors that are caused by this non-linearity to be ignored. For example, if the nominal positioning of the image transitions is controlled in 25% increments from a 0% offset position to a 100% offset position (see FIG. 7A), adequate positioning precision usually can be achieved by selecting the scan pitch so that it is no greater than one half the FWHM diameter of the scan spot.

A variety of known techniques may be employed for reducing the scan pitch of a more or less conventional xerographic printer, such as printer 11 (FIG. 1). For instance, the angular velocity of the scanner 17 can be increased, the linear velocity at which the photoreceptor 14 is advanced can be decreased, and/or the number of scan spots that are used can be increased.

Figure 7A:
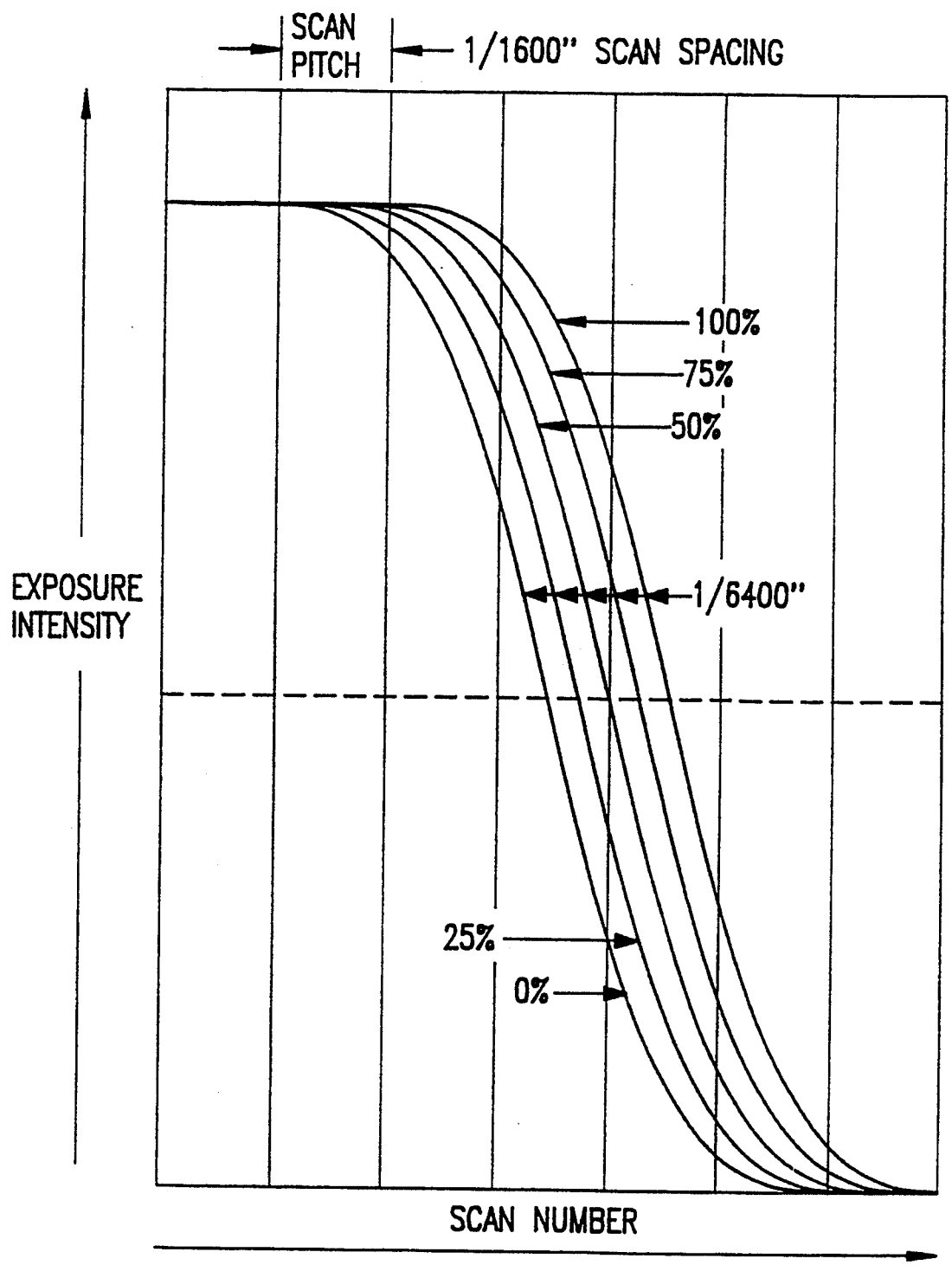
FIG. 7A illustrates the substantially linear, microaddressability that this invention provides for overscanned, ROS printers at a 2× overscan.

However, the favored approach for applying this invention to existing laser xerographic print engines is to employ additional scan spots because the number of scan spots generally can be increased without having to radically modify any of the electromechanical components of the print engine. Thus, FIG. 7A illustrates the microaddressability that can be built into a more or less conventional 400 d.p.i. laser xerographic print engine by substituting a quadspot laser (i.e., a laser that supplies four independently modulable, parallel output beams) for the single beam laser that is ordinarily used in such a print engine. This change reduces the scan pitch from 1/400" to 1/1600".

Figure 7B:
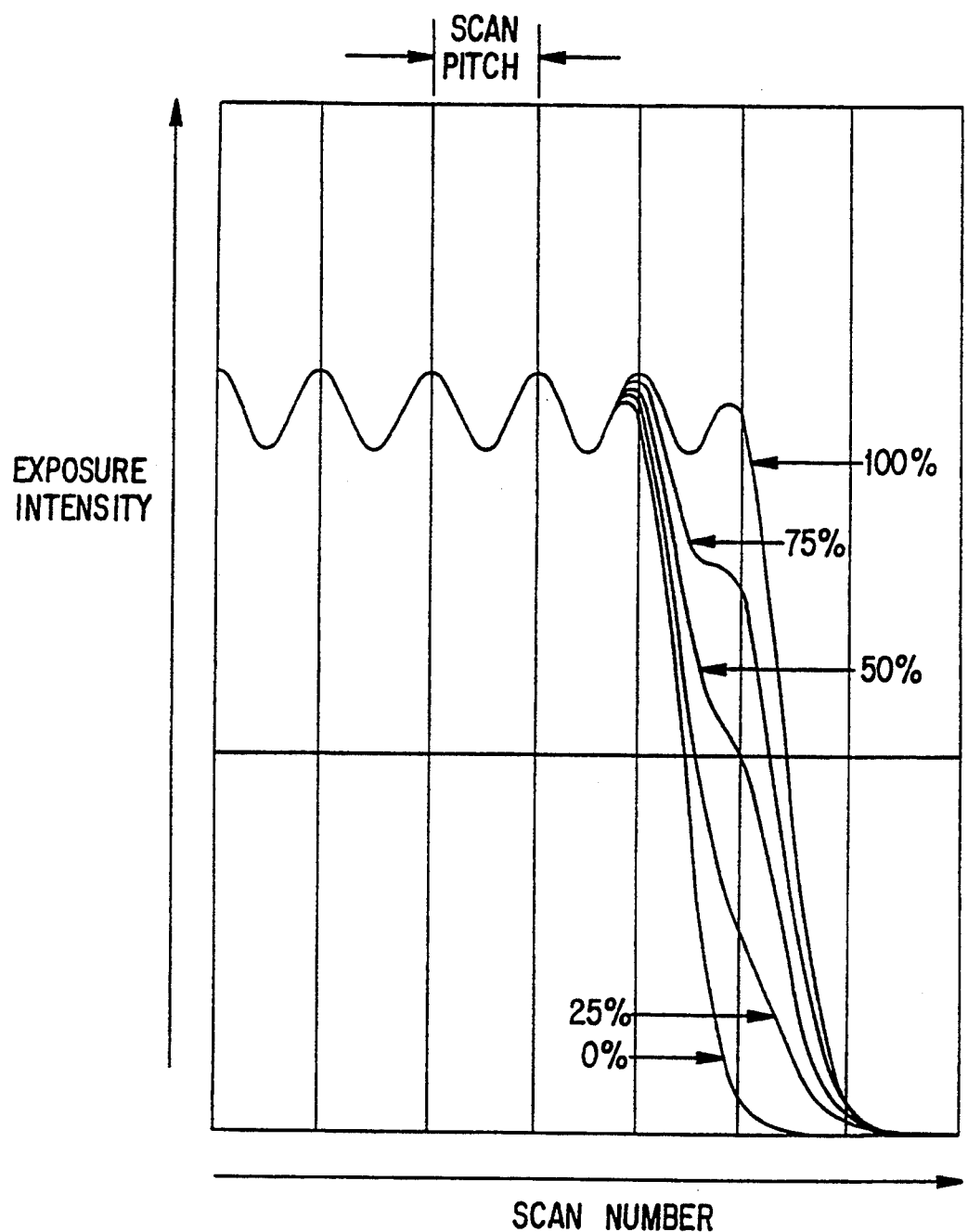
FIG. 7B illustrates the non-linearity of the addressability that such printers possess and the variable edge profiles they produce when they use conventional scan patterns.

In keeping with this invention, each of the four scan spots of such a quadspot printer suitably is selected to have a FWHM diameter of approximately 1/800" (i.e., twice the scan pitch) to provide a 2× overscan of the photoreceptor. Furthermore, the four parallel laser beams are independently modulated in accordance with respective streams of, say, three bit long data values, thereby providing sufficient microaddressability for spatially offsetting image transitions from the macroaddressable exposure boundaries by 0%, 25%, 50%, 75%, or 100% of the scan pitch, as previously described. As shown in FIG. 7A, a quadspot printer that conforms to the foregoing specifications is able to control the spatial positioning of the exposure boundaries/image transitions in the images that it prints to a precision of about 1/6400" in the process direction. Furthermore, the slope at which the composite exposure profile 38 crosses the xerographic threshold 39 in such a printer does not significantly vary as a function of the boundary scan intensity, so the microaddressability of the printer is substantially unaffected by the usual tendency of its xerographic threshold 39 to shift upwardly and downwardly by relatively small amounts as a function of the ambient operating conditions (i.e., temperature, humidity, etc.). To illustrate the contribution of the 2× overscan to the printer performance shown in FIG. 7A, FIG. 7B illustrates the comparable performance of a non-overscanned printer that uses, for example, a 1/800" scan spot and a scan pattern having a pitch of 1/800".

Figure 8:
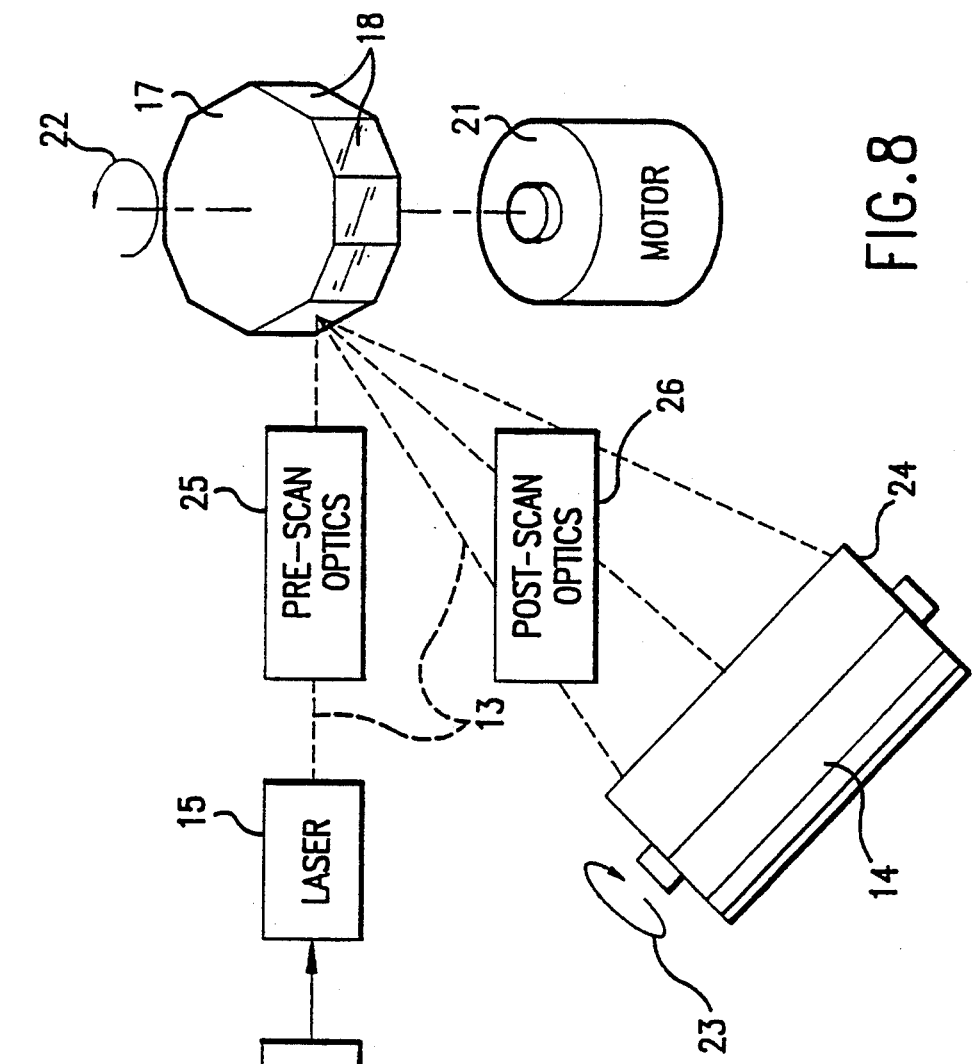
FIG. 8 illustrates an alternative boundary scan intensity modulation technique for printers of the type shown in FIG. 1.

Returning for a moment to the single beam/single scan spot embodiment of FIG. 1, it will be seen that the drive current for the laser diode 15 is serially modulated in accordance with the data values that are clocked out of the data source 23, thereby intensity modulating the laser beam 13 at the data clock rate in accordance with those data values. As more fully described in a copending and commonly assigned United States patent application of D. N. Curry, which was filed Jun. 28, 1990 under Ser. No. 07/545,744 on an "Arithmetic Technique for Variable Resolution Printing in a ROS" (D/90241), a digital duty cycle modulator 41 can be employed for driving the laser 13 with current pulses that are duty cycle modulated in accordance with such multi-bit data values. This has the advantage of being a strictly digital technique for intensity modulating the laser beam 13. Alternatively, however, a digital-to-analog (D/A) converter 42 (FIG. 8) could be employed for converting the multi-bit digital data values into corresponding analog signal levels. When this analog approach is used, the analog control signal that is provided by the D/A converter 42 is applied to an amplitude modulator 43 for amplitude modulating the drive current for the laser 15 (and, thus, the amplitude of the laser beam 13) in accordance with the data values.

Further applications of this invention will suggest themselves. As will be understood from the foregoing teachings, intensity modulated boundary exposures can be employed to provide substantially linear, sub-resolution control over the spatial positioning of image transitions in exposure profiles that are composed by printing multiple, superpositioned, discrete exposures on a high gamma, photosensitive recording medium, provided that the center-to-center spacing of the exposures is significantly less than the effective diameter of the footprint of the radiation to which the recording medium is exposed (i.e. the FWHM diameter of the incident print spot if the printing is performed by a gaussian spot).

Figure 9:
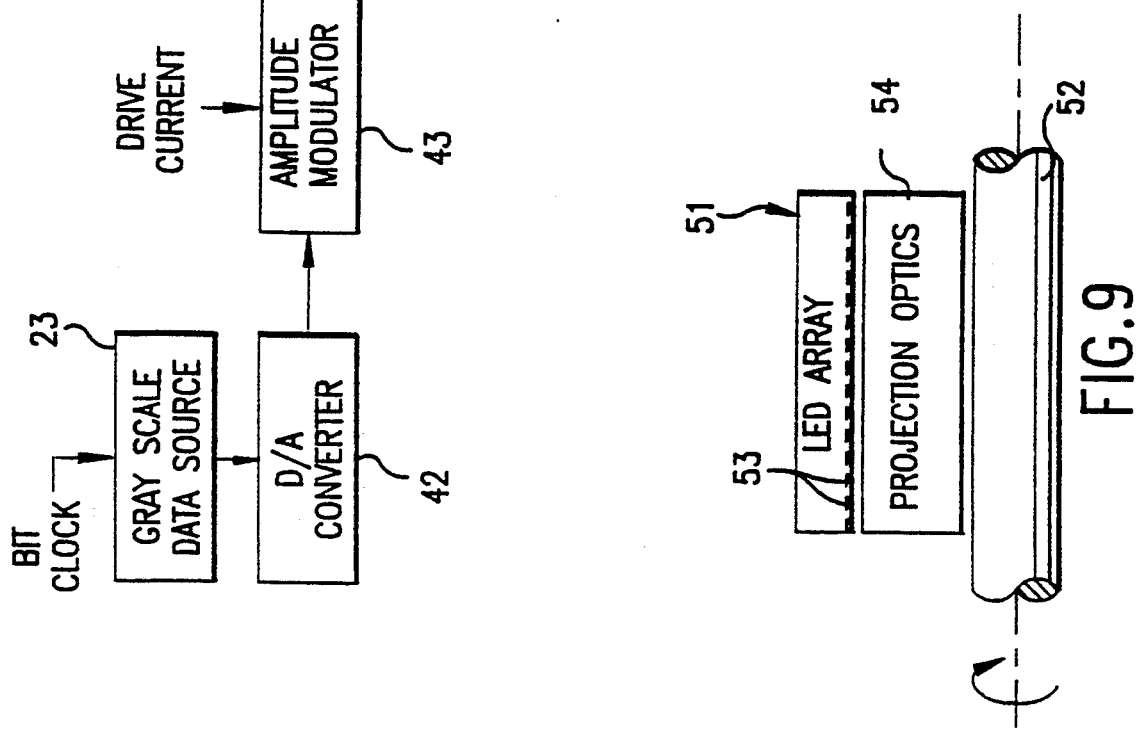
FIG. 9 schematically illustrates the use of the present invention for increasing the addressability of an optical image bar along an axis that is colinear with the individual pixel generators of the image bar.

This generalization means, for example, that the present invention can be applied to optical image bars, such as the LED image bar that is shown in FIG. 9 at 51, for increasing the transverse precision with which these image bars spatially position image transitions in images they print on high gamma recording media, such as the xerographic photoreceptor 52. More particularly, as shown in FIG. 9, the image bar 51 is composed of a linear array of individually addressable LED's 53 that are distributed widthwise of the photoreceptor 52 on generally uniformly spaced centers for sequentially exposing the photoreceptor 52 to successive lines of an image as the photoreceptor 52 is being advanced (by means not shown) in an orthogonal process direction. In this embodiment, the image bar 51 is projected onto the photoreceptor 52 by suitable projection optics 54, such as an array of SELFOC (self-focusing) lenses. Alternatively, however, it could be imaged onto the photoreceptor 52 at a predetermined magnification by imaging optics (not shown).

As will be appreciated, each of the line-like exposure profiles that the image bar 51 prints on the photoreceptor 52 is composed of multiple, superpositioned, discrete exposures that have contrast levels which vary in accordance with the output intensities of the respective LED's by which they were printed. Thus, to carry out this invention, the projection optics 54 (or the imaging optics) are designed to cause the center-to-center spacing of these superpositioned exposures to be substantially less than the effective diameter of the individual print spots that are produced by the LEDs. This provides the microaddressability that enables the spatial positioning of the transitions in the images that the image bar 51 is printing to be controlled to a sub-resolution precision lengthwise of the array of LEDs 53 by intensity modulating the light beams that are emitted by the individual LEDs 53 to expose the photoreceptor 52 to appropriately modulated boundary scans.

In view of the following example, it will be appreciated that the location of a transition in the process direction may be microaddressed by printing the printed lines in the vicinity of the transition with a predetermined and appropriate intensity or exposure level.

FIGS. 5A–5C show a process direction impulse response of a printer having a partial intensity boundary scan and a pitch distance of 0.50 times the FWHM diameter of the scan spot. In FIG. 5A, the boundary scan is shown at 36, the composite of the remaining scans is shown at 35, and the xerographic threshold is shown at 39. The remaining scans are exposed at full intensity. Boundary scan 36 is exposed at a partial intensity which is so weak that alone it would not cross the xerographic threshold, thus alone it would not cause printing to occur.

The composite of the remaining scans 35 which does not include boundary scan 36 is the result of a sequence of full intensity scans extending to and ending with the scan immediately preceding (in FIG. 5A, to the left of) the boundary scan 36. Due to the generally bell-shaped nature (describable as a Gaussian curve) of the exposure pattern in the process direction of a single scan, the exposure pattern of the composite of the remaining scans 35 tapers off to cross the xerographic threshold 39 at a point midway between the center lines of two adjacent scans, thus only printing at locations to the left (in FIG. 5A) of the threshold crossing.

Note that the exposure profile 38 (FIG. 5B), formed as a composite of the boundary scan 36 (FIG. 5A) and the composite of the remaining scans 35 (FIG. 5A), crosses the xerographic threshold at a process direction location to the right (in FIGS. 5A and 5B) of the location at which the composite of the remaining scans 35 (FIG. 5A) crosses the threshold. Thus, it can be appreciated that the partial boundary scan 36 (FIG. 5A) "influences" the location at which the exposure profile 38 (FIG. 5B) crosses the xerographic threshold 39, and therefore, "influences" the location at which an edge will be printed. In fact, the edge may be relocated within a small range and in small increments in the process direction by controlling the intensity of the boundary scan 36 (FIG. 5A). Therefore, by intensity modulating the boundary scan, the edge to be printed can be microaddressed in the process direction. The addressability in the process direction is based on the number of intensity steps (i.e., the size of each individual intensity step) producible by the writing device.

Figure 10:
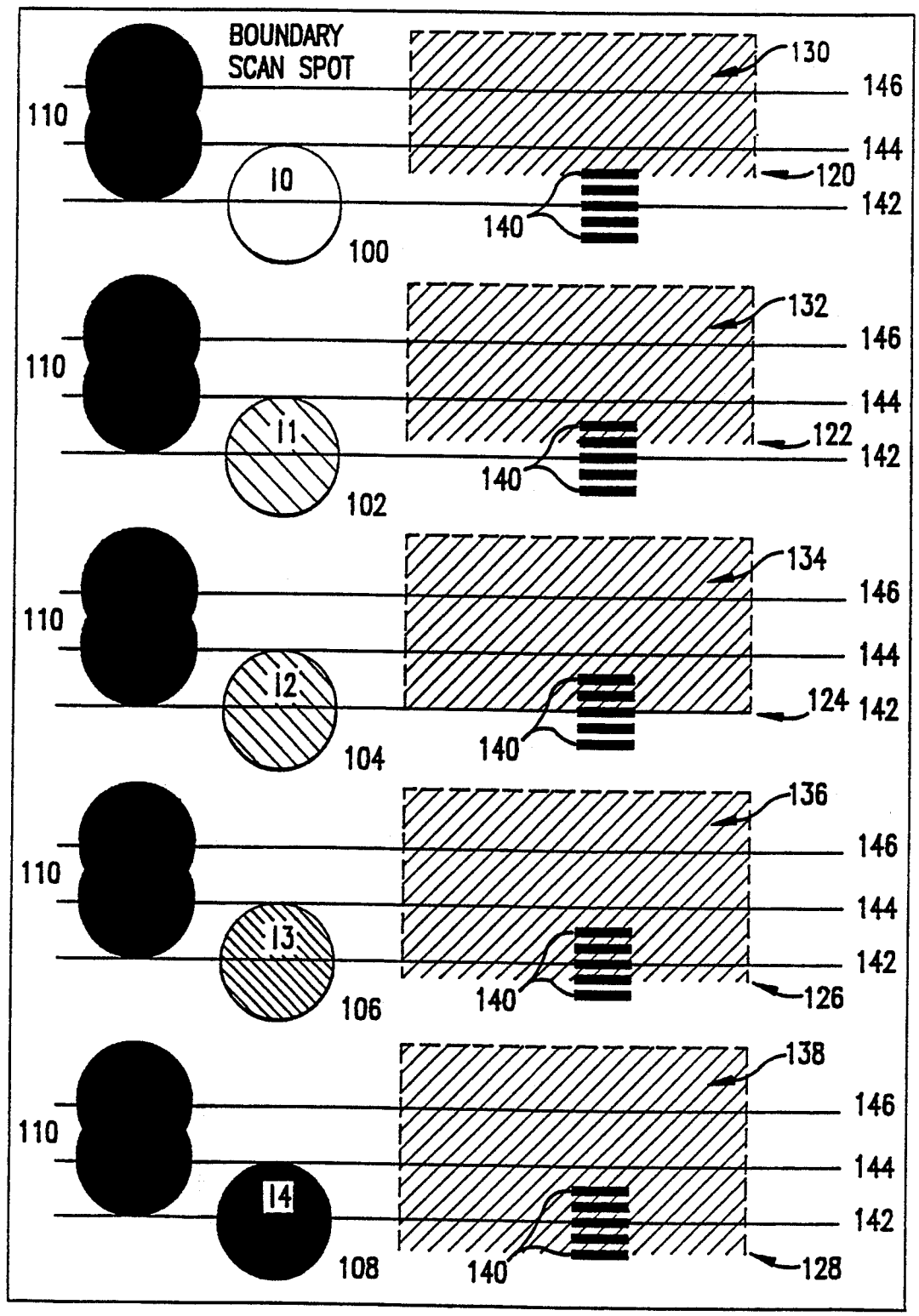
FIG. 10 shows print bit microaddressability and print line widths produced by a writing device intensity modulated according to the present invention.

In FIG. 10, an example of how the writing device may be intensity modulated to microaddress the location of an edge to be produced. A writing device, such as a scanning laser spot or a light emitting diode spot, writes an exposure (i.e., a print bit) that is combined with exposures from previous or adjacent scans. The exposure of a boundary scan can be illustrated as having a predetermined size, for example the size shown as the circles depicted at 100–108. The writing device intensity modulates the spot intensity to produce various exposure levels. For example, in FIG. 10 spots 100–108 are produced by intensity modulating the writing device at respective intensity levels I0–I4. Note that the boundary scan is indicated on scan line 142.

Two adjacent and prior scans are indicated on scan lines 144 and 146 so that the boundary scan overlaps the adjacent scan by a pitch distance equal to 0.50 times the FWHM. In FIG. 10 the adjacent spots are shown at 110. One or more adjacent spots are written at full (100%) intensity. The combination of the exposures of the boundary scan spot and the adjacent scan spots produce an exposure profile in the process direction having a transition where the exposure profile crosses the xerographic threshold as indicated at 120–128. Transition 124 corresponds to the transition indicated in FIG. 5B of exposure profile 38 across the xerographic threshold 39 with boundary scan intensity set to I2. In FIG. 10 transition 120 corresponds to the transition in FIG. 5A where the composite of the remaining scans 35 without the boundary scan 36 crosses the xerographic threshold 39 (this is equivalent to the boundary scan 36 in FIG. 5A being exposed at intensity I0). Thus, it can be seen that the location of the transition (e.g., 120–128) where the total exposure profile in the process direction crosses the xerographic threshold can be controlled precisely by intensity modulating the boundary scan.

In FIG. 10 the writing device is intensity modulated to produce five intensity values from I0–I4, that is to say four intensity steps. When spot 100 is intensity modulated at intensity I0, transition 120 occurs at two microaddress steps above (in FIG. 10) the center line 142 of the boundary scan. When spot 102 is intensity modulated at intensity I1, the transition 122 occurs at 1 microaddress above the center 142 of the boundary scan. When spot 104 is intensity modulated at intensity I2, transition 124 occurs at the center of the boundary scan 142. When spot 106 is intensity modulated at intensity I3, transition 126 occurs one microaddress step below (in FIG. 10) the center line of the boundary scan 142. When spot 108 is intensity modulated at intensity I4, the transition 128 occurs at two microaddress steps below the center of the boundary scan 142. Thus, by intensity modulating the boundary scan from I0 through I4, the transition may controlled between transition 120 and 128 in microaddress steps indicated at 140.

When the writing device is scanned in the fast scan direction (horizontal in FIG. 10), an edge is produced between a writing area 130–138 and areas where the exposure profile remains below the xerographic threshold (so as to be unable to produce a writing area). The transition or edge 120–128 is thus microaddressed in microaddress steps. Clearly, by increasing the number of intensity steps, the number of microaddress steps may also be increased. Therefore, microaddress steps may be made arbitrarily small until the limits of the xerographic printer resolution is reached.

Figure 11A:
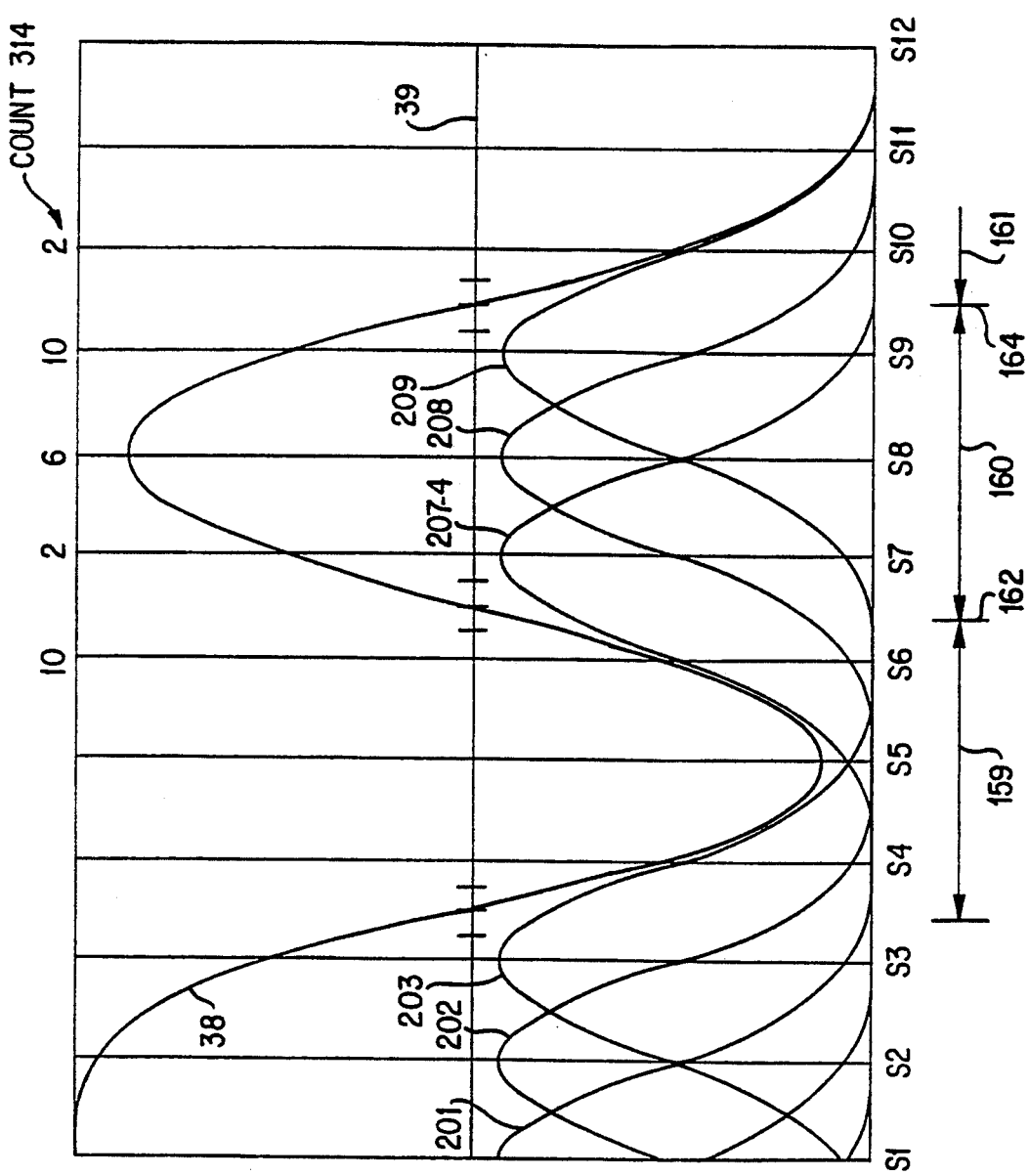
FIGS. 11A-11C show an example of a process direction exposure profile according to the present invention.
Figure 11B:
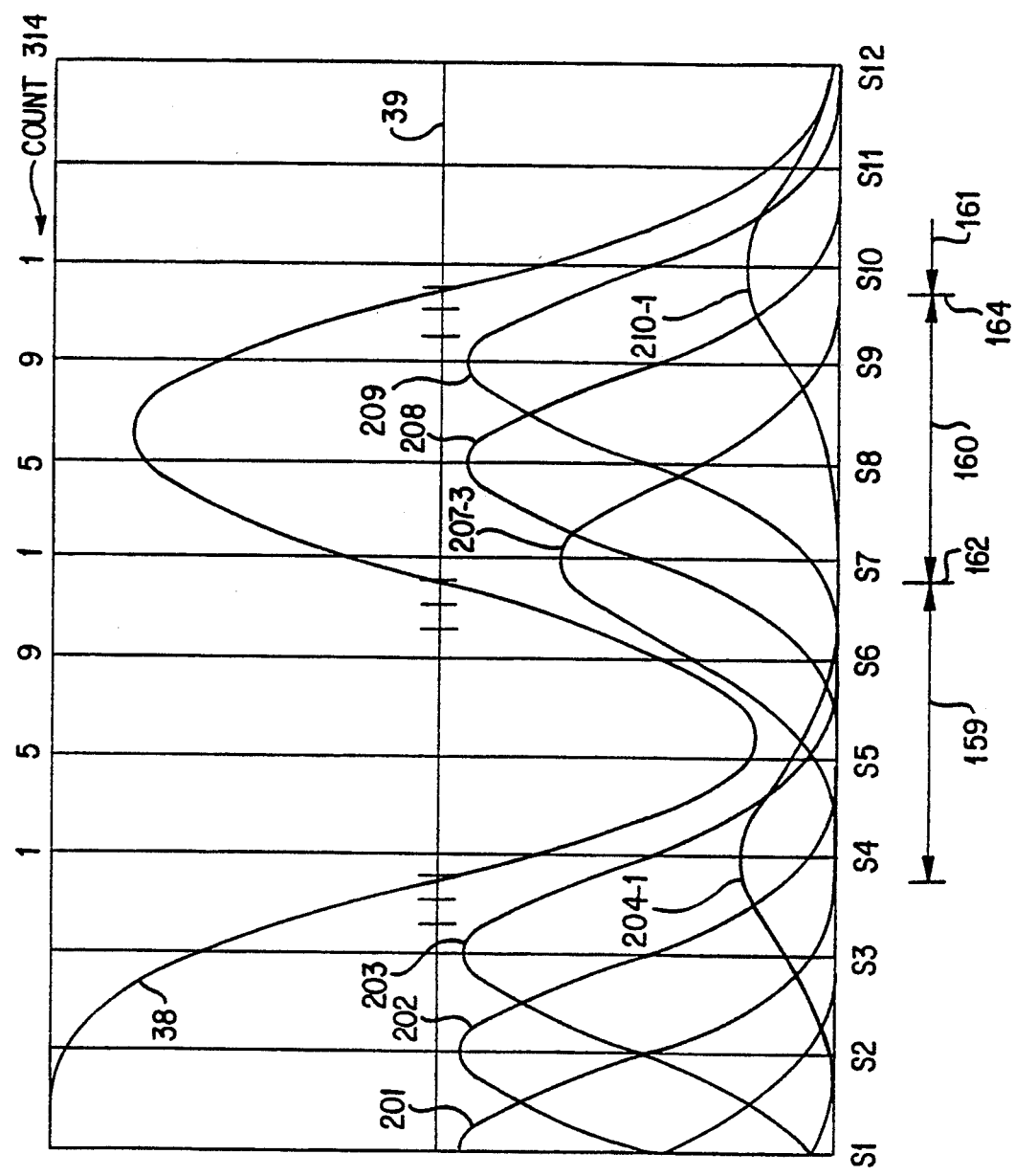
Figure 11C:
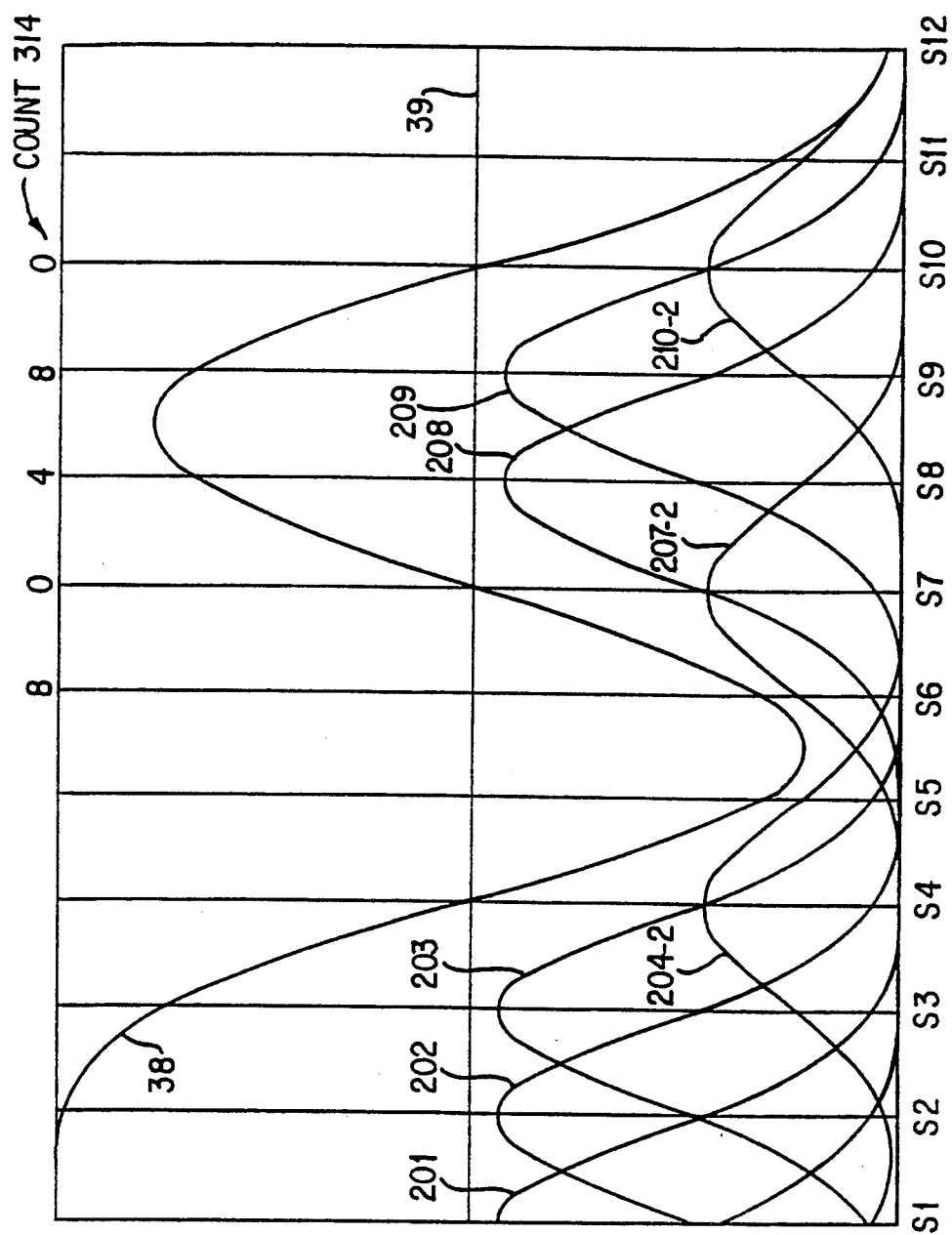

FIGS. 11A–11C illustrate a particular case of an edge and a feature line being printed. In FIGS. 11A–11C, the center of individual scans are shogun at S1–S12. The exposure profile in the process direction produced by a writing device writing with maximum intensity is shown by profile 201–203 corresponding to scans S1–S3, respectively. Note that profile 202 extends from the center line of scan S1 to the center line of scan S3, thus defining the size of the FWHM. Also note that scan profile 202 follows scan profile 201 and is separated in the process direction by a pitch distance equal to one-half of the FWHM. Similarly, scan profile 203 is separated from scan profile 202 by the same pitch distance. Also note that the exposure magnitudes of any individual scan profile 201–203 is less than the xerographic threshold 39. That is to say, any individual scan 201–203, taken alone, will be unable to exceed the xerographic threshold 39 and write. On the other hand, the composite exposure profile 38 indicates that, taken together, the exposure profiles in the process direction well exceed the xerographic threshold 39 at the center of scans S1–S3 until a transition occurs at a point midway between the center of scans S3 and S4.

In FIG. 11B, exposure profiles 201–203 are written at full intensity and a new exposure profile 204-1 is created for scan S4 at intensity level I1. The addition of exposure profile 204-1 moves the composite profile 38 to the right (in FIG. 11B) by an amount equal to one-fourth of the pitch distance (referred to as one microaddress step). In FIG. 11C scan S4 is modulated at intensity I2 to produce exposure profile 204-2. This increased intensity of scan S4 further moves the transition to the right (in FIG. 11C) where composite exposure profile 38 crosses the xerographic threshold 39. By comparing FIGS. 11A–11C, one can see how intensity modulating the writing device during scan S4 from intensity I0–I2 moves the transition from a position midway between the center lines of scans S3 and S4 to the center line of scan S4 in microaddress steps of one-fourth of the pitch distance. The transitions illustrated in FIGS. 11A–11C correspond to transitions 120–124 (FIG. 10) where scan center line S4 in FIGS. 11A–11C corresponds to boundary scan center line 142 in FIG. 10.

FIGS. 11A–11C also illustrate the printing process for printing a feature or raster line. In FIGS. 11A–11C, the writing device is intensity modulated while scanning through scans S7–S10. In FIG. 11A, the writing device is intensity modulated at intensity I4 to produce exposure profile 207-4 during scan S7; and also is intensity modulated at intensity level I4 during scans S8 and S9 to produce exposure profiles 208 and 209. The composite exposure profile 38 shows the xerographic threshold 39 being crossed at a point midway between the center of scans S6 and S7, and being crossed again at a point midway between the center of scans S9 and S10. The positions of raster lines 159, 160 and 161 are shown with respect to scan lines with writing intensities which could cause an exposure to write raster line 160. Note that the raster lines are phase shifted with respect to the center of the scans by two addressability units between FIGS. 11A and 11C.

In FIG. 11B, the writing device is intensity modulated at intensity I3 during scan S7 and intensity modulated at intensity I1 during scan S10 to produce scan profiles 207-3 and 210-1 centered about the center of scan S7 and S10, respectively. The writing device is modulated at intensity I4 during scans S8 and S9 to produce exposure profiles 208 and 209. The two transition points where the composite exposure profile 38 crosses the xerographic threshold 39 in FIG. 11B is shifted to the right by one microaddress step (one quarter of the pitch distance). This shift is illustrated by a right shift of one addressability unit of raster lines 159, 160 and 161. Note that the raster line width of raster line 160 remains the same.

In FIG. 11C, the writing device is intensity modulated at intensity I2 during scans S7 and 510 to produce exposure profiles 207-2 and 210-2. The two transitions where composite exposure profile 38 crosses the xerographic threshold 39 are thus moved to the right (in FIG. 11C) by an additional microaddress step (when compared to FIG. 11B). This again is illustrated by the raster lines 159–161.

Figure 13:
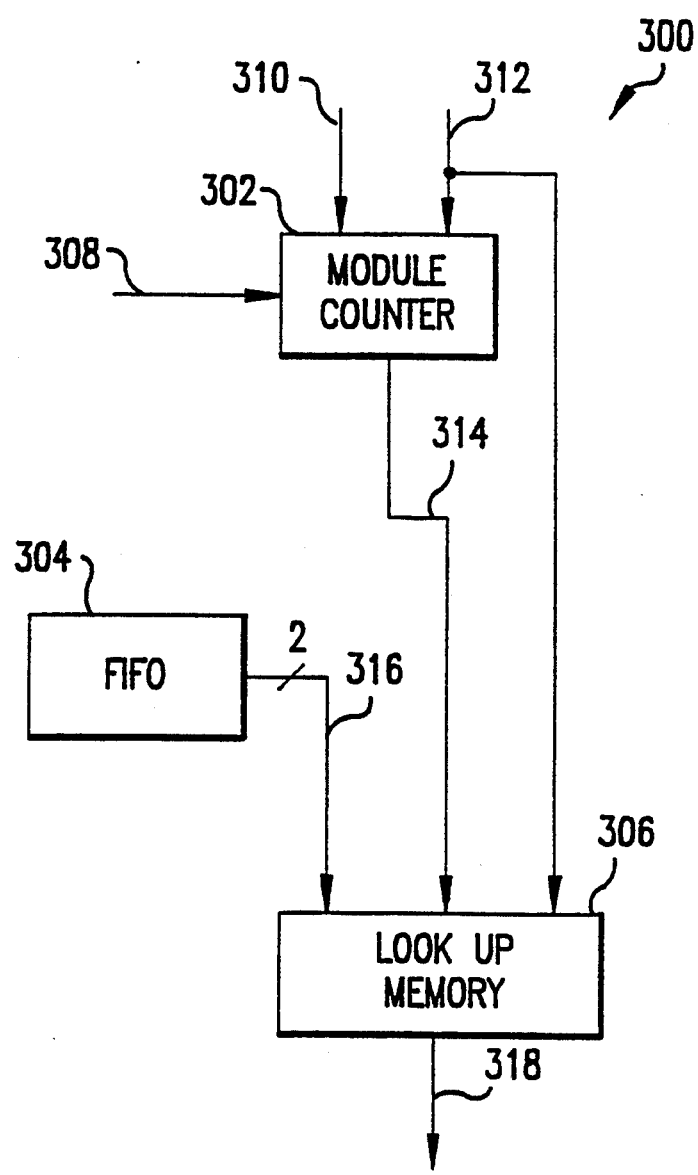
FIG. 13 is a circuit schematic for a print intensity controller according to the present invention.

A printer capable of producing an image raster line 160 as shown in FIGS. 11A–11C, has a print intensity controller 300 as shown in FIG. 13. The print intensity controller is concerned with producing a print intensity signal to drive the writing device according to the current image bit and an adjacent image bit.

The First In First Out (FIFO) buffer 304 (FIG. 13) contains two image raster lines of data: a current image raster line (i.e., the image raster line through which the center of the current scan line passes) and an adjacent image raster line. Each image raster line includes data organized in a series of image bits. The current image bit may be in either a first or a second state and the adjacent image bit may be in either a first or a second state. A first state indicates that the image bit is to be fully written (ON) and a second state indicates that the image bit is to remain unwritten (OFF).

In FIG. 13, print intensity controller 300 includes modulo counter 302, First In First Out (FIFO) buffer 304 and look up memory 306 (for example, a read only memory or a PROM). The modulo counter is incremented for each scan of the writing device upon the occurrence of a counter clock 308. When the modulo counter is incremented, it is incremented by a modulo increment value 312. The modulo increment value 312 is the number of intensity steps that extend across a pitch distance in the process direction (to be referred to as L), that is to say the number of intensity values less 1. In the example shown in FIG. 10, there are five intensity values and four intensity steps. The modulo counter modulo counts according to a modulo base (or a modulus, M) 310. The modulo base is the number of sub-addresses per image raster width. For example, in FIGS. 11A–11C an image raster line is twelve microaddress steps wide between left edge 162 and right edge 164. Therefore, modulo base 310 would be twelve to produce the line width depicted in FIGS. 11A–11C. It is easy to see how a larger modulo base will produce a wider raster line width.

The modulo counter is incremented before the beginning of each scan according to counter clock 308 by the amount of the modulo increment value 312. If the modulo counter equals or exceeds its modulus, it resets itself to the amount by which it exceeds its modulus, thereby always having a count that varies from 0 to its modulus-1. The output of modulo counter 302 is a offset value 314 which can be used as a measure of where an image transition or raster edge is to be printed relative to the center of the current scan. This is illustrated in FIGS. 11A–C where the offset value 314 is indicated at the top of each scan. In FIG. 11A, S6 through S10 have values 10, 2, 6, 10, 2, as indicated, assuming the transitions between rasters at 162 and 164 are indicated by a zero value in the counter. If that is the case, then the same scans in FIG. 11B would have values 9, 1, 5, 9, 1, and for FIG. 11C the values would be 8, 0, 4, 8, 0, in keeping with the phase shift of the image rasters. Thus, the look up memory receives the offset value 314 to determine the location of the image transition. Likewise, the look up memory also receives the modulo increment value 312 to determine the number of sub-address steps that may be implemented by appropriately intensity modulating the writing device. The look up memory receives the current and adjacent image bits from the First In First Out buffer 304. Thus, the look up memory 306 has all inputs necessary to determine the required intensity modulation signal 318 necessary to achieve sub-addressability as illustrated in FIGS. 11A–11C. The look up memory may be any suitable memory, including a read only memory or a PROM. Although the look up memory provides a digital output signal indicative of the required intensity signal, it will be appreciated that the digital output signal may be easily converted into an analog output signal to intensity modulate the writing device.

With the above described technique it is easy to implement an extremely flexible two dimensional integer resolution conversion. For example, in a scanned writing device that produces 1200 scans per inch with 2:1 overlap (i.e., 50% of one scan overlaps the prior adjacent scan), a transition in the process direction may be positioned to a per inch accuracy of one part in 4800, 6000, 7200 and 8400 (referred to as addressable steps per inch, A), when the number of intensity steps produced by the writing device is 4, 5, 6 and 7 respectively. That is to say 4, 5, 6 and 7 intensity steps multiplied by 1200 scans per inch produces addressability of 4800, 6000, 7200 and 8400, respectively. Image data comprising image raster lines of various widths may be easily produced using the modulo counter. Table 1 shows that the possible image raster widths (i.e., image raster resolutions, D) expressed in addressable steps (supported by the print intensity controller) may vary from 141 to 400 steps. The table entries are the process direction image resolutions in bits (rasters) per inch. Thus, integer conversion of a large number of raster line widths is supported by simply changing the modulo base and the number of intensity steps. The resolution of image data sent to a printer, such as the printer described in this embodiment, need not exactly match the scans per inch of the printer. Instead, the print intensity controller adjusts microaddressability by the controller to achieve integer resolution conversion from any image data resolution to the scans per inch of the printer. The resolution in the fast scan direction may be adjusted by clock frequency. The modulo counter may be an accumulator or counter. It will be understood that print intensity modulation to produce various intensity values may be achieved by many techniques including (1) constant intensity pulses with varying pulse durations, (2) constant intensity pulse groups with a varying number pulses per group (each pulse of constant or varying duration), (3) varying intensity pulses (i.e., the drive voltage and/or current varies), or (4) any combination to the required intensity value.

Figure 12:
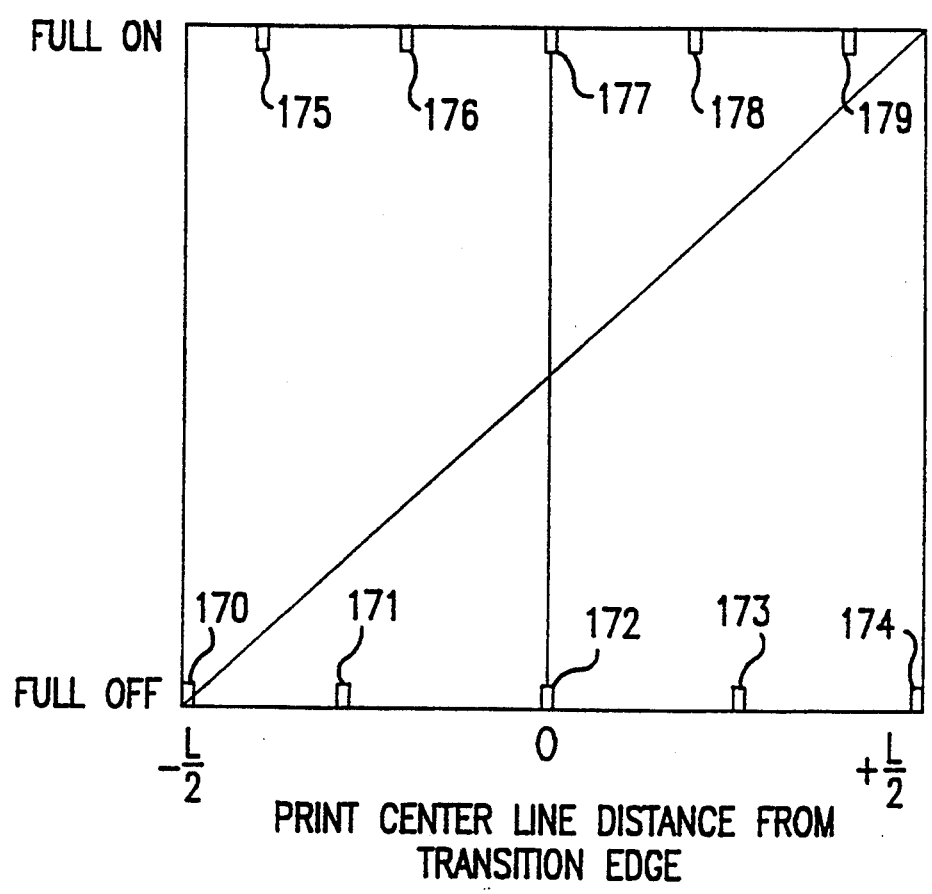
FIG. 12 is a graph showing an addressability response curve for the print intensity controller of FIG. 13.

FIG. 12 is a graph of an addressability response curve for the print intensity controller of FIG. 13. The vertical axis of the graph is the print intensity required from the writing device which ranges from full off to full on. The horizontal axis is the print centerline distance from the desired transition edge. The horizontal axis is centered at zero and extends from $-L/2$ through $+L/2$. If the centerline of the current scan is at a distance from the desired transition edge that is greater than or equal to L/2 (where L is the pitch distance) then the writing device will be written with either a full on or a full off intensity depending on which side of the transition edge is being written.

When the centerline of the writing device is within a distance of L/2 of the desired transition edge, the writing device writes at an intensity greater than full off (zero intensity) and less than full on (maximum intensity), according to the addressability response curve. For example, when the centerline of the writing device (i.e., the scan line) coincides with the transition edge (as depicted at 172 or 177), the displacement distance of the centerline from the transition edge is zero. Therefore, in accordance with FIG. 12, the writing device is written with an intensity halfway between full on and full off.

The bottom horizontal edge of the graph depicts marks 170–174 separated by one quarter of the pitch distance (corresponding to the value L), corresponding to four intensity steps such that the distance between adjacent ones of each of the marks 170–174 correspond to one microaddress step. When the centerline of the writing device (i.e., the scan center line) is one or two microaddress steps to the left of the zero reference line (as depicted at 171 and 170, respectively), then the writing device is driven to produce an intensity value corresponding to one quarter or zero, respectively, of the full on intensity value. When the centerline of the writing device is one or two microaddress steps to the right of the zero reference indicating the transition edge (as depicted at 173 and 174, respectively) then the writing device is driven to produce an intensity value equal to three quarters or all of the full on intensity value.

TABLE I

| Modulo base, M | Image Raster Resolution, D Addressable Steps Per Inch | | | |
|---|---|---|---|---|
| | 4800 | 6000 | 7200 | 8400 |
| 50 | | | 144 | 168 |
| 49 | | | 147 | 171 |
| 48 | | | 150 | 175 |
| 47 | | | 153 | 179 |
| 46 | | | 157 | 183 |
| 45 | | | 160 | 187 |
| 44 | | | 167 | 191 |
| 43 | | | 167 | 195 |
| 42 | | 143 | 171 | 200 |
| 41 | | 146 | 176 | 205 |
| 40 | | 150 | 180 | 210 |
| 39 | | 154 | 185 | 215 |
| 38 | | 158 | 189 | 221 |
| 37 | | 162 | 195 | 227 |
| 36 | | 167 | 200 | 233 |
| 35 | | 171 | 206 | 240 |
| 34 | 141 | 176 | 212 | 247 |
| 33 | 145 | 182 | 218 | 255 |
| 32 | 150 | 188 | 225 | 263 |
| 31 | 155 | 194 | 232 | 271 |
| 30 | 160 | 200 | 240 | 280 |
| 29 | 166 | 207 | 248 | 290 |
| 28 | 171 | 214 | 257 | 300 |
| 27 | 178 | 222 | 267 | 311 |
| 26 | 185 | 231 | 277 | 323 |
| 25 | 192 | 240 | 288 | 336 |
| 24 | 200 | 250 | 300 | 350 |
| 23 | 209 | 261 | 313 | 365 |
| 22 | 218 | 273 | 327 | 382 |
| 21 | 229 | 286 | 343 | 400 |
| 20 | 240 | 300 | 360 | |
| 19 | 253 | 316 | 379 | |
| 18 | 267 | 333 | 400 | |
| 17 | 282 | 353 | | |
| 16 | 300 | 375 | | |
| 15 | 320 | 400 | | |
| 14 | 343 | | | |
| 13 | 369 | | | |
| 12 | 400 | | | |

The horizontal line across the top of FIG. 12 indicates, as an alternative number of microaddress steps, microaddress steps at 175–179. Note that marks 175–179 correspond to L=5 microaddress steps per pitch distance. When the writing device centerline is one or two steps to the left of the zero reference transition edge (as depicted at 176 and 175, respectively), the writing device is driven to produce an intensity value corresponding to 30% and 10% of the full on intensity value, respectively. When the writing device centerline is one or two microaddress steps to the right of the zero reference line (as depicted at 178 and 179, respectively), then the writing device is driven to produce an intensity value equal to 70% or 90% of the full on intensity value, respectively. With the displacement distance in the process direction from the print line center to the transition edge (represented by a value, m) varying from $-L/2$ to $+L/2$, where L is the pitch distance and the minus "−" sign means the print line center passes through an image bit that corresponds to an exposure that is at a low intensity state, the required intensity value I is given by $I=(m+L/2)*Im$, where Im is the maximum (on) intensity value. Persons skilled in the art will appreciate how to extend the addressability response curve of FIG. 12 to evaluate the intensity value required at a border scan for any number of microaddress steps defined within a pitch distance. The intensity value evaluated according to the vertical axis in FIG. 12 is the required intensity modulation signal output from the look-up memory 306. It will be appreciated that other means, in addition to a look-up memory may be employed to produce the intensity modulation signal 318, although a look-up memory is a convenient and low cost means given the digital input signal representing offset value 314 derived from modulo counter 302, the digital output from First In First Out buffer 304 and the modulo increment value 312 in digital form.

Conclusion

In view of the foregoing, it now will be evident that the present invention provides relatively inexpensive and easily implemented methods and means for increasing the spatial addressability of printers and other optical display systems that render images on high gamma, photosensitive recording apparatus. These rendering systems are operated in an overscanned mode to provide the microaddressability that enables them to utilize intensity modulated boundary scans for substantially linearly controlling the spatial positioning of the transitions that are contained by the images they are rendering to a subresolution precision.

What is claimed is:

1. A method for resolution conversion by microaddressing an image transition in a printer writing successive print lines by intensity modulation of a writing device, each successive print line containing print bits that form a cumulative exposure of a photosensitive surface, the successive print lines being separated by a pitch distance in a process direction, the print line having a print line center and a print line width greater than the pitch distance, the image transition being a transition between a current image bit located on a current print line and an adjacent image bit located on an adjacent print line, the current image bit and the adjacent image bit having one of a first bit state and a second bit state, the current image bit and the adjacent image bit being printed so as to be separated in the process direction, the method comprising steps of:

writing the print bit at maximum intensity when (1) the current image bit is in the first bit state and the adjacent image bit is in the second bit state, (2) the print line center passes through the current image bit and (3) the pitch distance is less than or equal to twice a displacement distance in the process direction from the print line center to the image transition beginning an image formation;

writing the print bit at less than maximum intensity when (1) the current image bit is in the first bit state and the adjacent image bit is in the first bit state, (2) the print line center passes through the current image bit and (3) the pitch distance is greater than twice a displacement distance, wherein the step of writing the print bit at less than maximum intensity including a step of intensity modulating the writing device based on a location of the image transition located at one of a plurality of microaddresses extending above and below the print line center, the plurality of microaddresses equally dividing the pitch distance; and writing the print bit at less than maximum intensity when (1) the current image bit is in the first bit state and the adjacent image bit is in the second bit state, (2) the print line center passes through the current image bit, and (3) the pitch distance is greater than twice the displacement distance, wherein the step of writing the print bit at less than maximum intensity including a step of intensity modulating the writing device based on a location of the image transition located at one of a plurality of microaddresses extending above and below the print line center, the plurality of microaddresses equally dividing the pitch distance.

2. The method of claim 1, wherein the step of writing the print bit at maximum intensity when the current image bit is in the first bit state and the adjacent image bit is in the first bit state.

3. The method of claim 1, wherein the step of intensity modulating the writing device, modulates the writing device to produce an intensity proportional to a sum of the displacement distance plus one-half of the pitch distance.

4. A method for resolution conversion by microaddressing an image transition in a printer writing successive print lines by intensity modulation of a writing device, each successive print line containing print bits that form a cumulative exposure of a photosensitive surface, the successive print lines being separated by a pitch distance in a process direction, the print line having a print line center and a print line width greater than the pitch distance, the image transition being a transition between a print image region and a non-print image region in the process direction, an adjacent image bit on an adjacent print line being adjacent to a current image bit on a current print line writing the print bit, and the current image bit characterized by one of a first current bit state and a second current bit state, the method comprising steps of:

writing the print bit at zero intensity when the current image bit is in the second current bit state and the non-print image region includes the current image bit, and a displacement distance in the process direction from the print line center to the image transition is one of greater than and equal to one-half of the pitch distance;

writing the print bit at maximum intensity when the current image bit is in the first current bit state and the print image region includes the current image bit, and the displacement distance is one of greater than and equal to one-half of the pitch distance; and writing the print bit at less than maximum intensity when the current image bit is in the first current bit state and the displacement distance is less than one-half of the pitch distance, the image transition being located at one of a plurality of microaddresses that equally divide the pitch distance above and below the current print line, the step of writing the print bit at less than maximum intensity including a step of intensity modulating the writing device based on the microaddress of the image transition.

5. A print intensity controller to generate intensity data for driving a writing device to microaddress an image transition in a process direction based on a pitch distance, an image raster width, a current image bit and an adjacent image bit, the writing device being controlled by the intensity data so as to produce a number of intensity steps between intensity values based on the microaddress of the image transition, the intensity data used to form a cumulative exposure of a photosensitive surface by the writing device, the print intensity controller comprising:

a modulo counter for generating offset data based on the pitch distance, the image raster width and the number of intensity steps, the offset data being used to measure where the image transition is printed relative to the microaddress and a center of a current scan; and means for producing the intensity data based on the number of intensity steps, the offset data, the current image bit and the adjacent image bit.

6. The print intensity controller of claim 3, further comprising a FIFO buffer for sequentially producing the current image bit and the adjacent image bit.

7. The method of claim 4, wherein the step of intensity modulating the writing device modulates the writing device to produce an intensity proportional to a sum of the displacement distance plus one-half of the pitch distance when the print image state includes the current print bit.

8. The method of claim 4, wherein the step of intensity modulating the writing device modulates the writing device to produces an intensity proportional to a sum of one-half of the pitch distance minus the displacement distance when the non-print image state includes the current print bit.

9. The print intensity controller of claim 4, further comprising a FIFO buffer for sequentially producing the current image bit and the adjacent image bit.

10. The print intensity controller of claim 1, further comprising a FIFO buffer for sequentially producing the current image bit and the adjacent image bit.

* * * * *